United States Patent
Eigner et al.

(10) Patent No.: US 12,421,421 B2
(45) Date of Patent: Sep. 23, 2025

(54) COMPOSITION INCLUDING A POLYORGANOSILOXANE AND AN AMINO-FUNCTIONAL SILANE AND METHOD OF USING THE SAME

(71) Applicant: 3M INNOVATIVE PROPERTIES COMPANY, St. Paul, MN (US)

(72) Inventors: Audrey A. Eigner, White Bear Lake, MN (US); Jon P. Nietfeld, Woodbury, MN (US); Chad M. Amb, Roberts, WI (US); Steven J. McMan, Stillwater, MN (US); Ara Z. Nercissiantz, Los Angeles, CA (US); Allison E. Strong, Warrenville, IL (US); John A. Luekemeyer, Jurupa Valley, CA (US); Derrick Tarn, Santa Ana, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 735 days.

(21) Appl. No.: 17/632,189

(22) PCT Filed: Jul. 30, 2020

(86) PCT No.: PCT/IB2020/057227
§ 371 (c)(1),
(2) Date: Feb. 1, 2022

(87) PCT Pub. No.: WO2021/024118
PCT Pub. Date: Feb. 11, 2021

(65) Prior Publication Data
US 2022/0267640 A1 Aug. 25, 2022

Related U.S. Application Data

(60) Provisional application No. 63/016,366, filed on Apr. 28, 2020, provisional application No. 62/955,913, (Continued)

(51) Int. Cl.
| | |
|---|---|
| *C09D 183/04* | (2006.01) |
| *C08G 77/18* | (2006.01) |
| *C08K 5/5415* | (2006.01) |
| *C08K 5/544* | (2006.01) |
| *C08K 5/5445* | (2006.01) |

(52) U.S. Cl.
CPC ........... *C09D 183/04* (2013.01); *C08G 77/18* (2013.01); *C08K 5/5415* (2013.01); *C08K 5/544* (2013.01); *C08K 5/5445* (2021.01)

(58) Field of Classification Search
CPC ......... C08G 77/18; C08G 77/50; C08K 5/544
See application file for complete search history.

(56) References Cited

U.S. PATENT DOCUMENTS

| | | |
|---|---|---|
| 4,339,563 A | 7/1982 | Takago |
| 4,525,400 A | 6/1985 | Surprenant |
| (Continued) | | |

FOREIGN PATENT DOCUMENTS

| | | |
|---|---|---|
| EP | 1323782 | 7/2003 |
| JP | 10-036771 | 2/1998 |
| JP | 10-195385 | 7/1998 |
| JP | 2000-063755 | 2/2000 |
| JP | 2001-259509 | 9/2001 |
| JP | 2001-348430 | 12/2001 |
| JP | 2002-029783 | 1/2002 |
| JP | 2005-082772 | 3/2005 |
| JP | 2006-144019 | 6/2006 |
| JP | 2006-256951 | 9/2006 |
| JP | 2007-070606 | 3/2007 |
| (Continued) | | |

OTHER PUBLICATIONS

Arkles, "Silicon Compounds: Silanes and Silicones", 2008, Second Edition, Table of contents, 3 pages.
(Continued)

*Primary Examiner* — Marc S Zimmer
(74) *Attorney, Agent, or Firm* — Kathleen B. Gross

(57) ABSTRACT

The composition includes a polyorganosiloxane and an amino-functional silane. The polyorganosiloxane has divalent units represented by Formula (I) and greater than two —Si(Y)$_p$(R)$_{3-P}$ groups, in which each R is a non-hydrolyzable group; each Y is a hydrolysable group; and p is 1, 2, or 3. The composition further includes an amino-functional silane represented by (R$^6$)$_2$N—[R$^4$—Z]$_r$—R$^4$—[Si(Y)$_p$(R$^5$)$_{3-P}$] or a cyclic azasilane of Formula (II). Each R$^4$ is a linking group; each R$^5$ is a non-hydrolyzable group; each Z is —O— or —N(R$^6$)—; each R$^6$ is hydrogen, alkyl, aryl, arylalkylenyl, or —R$^4$—[Si(Y)$_p$(R$^5$)$_{3-P}$]; R$^7$ is a linking group that can have at least one catenated —N(R$^8$)—; each R$^8$ is hydrogen, alkyl, or alkenyl, which may be substituted by an amino group; each Y is a hydrolyzable group; r is 0, 1, 2, or 3; and p is 1, 2, or 3. A method of using the composition to make a coated article is also described.

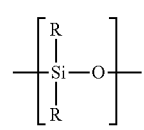

(I)

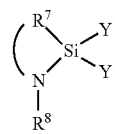

(II)

30 Claims, No Drawings

Related U.S. Application Data filed on Dec. 31, 2019, provisional application No. 62/882,289, filed on Aug. 2, 2019.

(56) References Cited

U.S. PATENT DOCUMENTS

| | | | |
|---|---|---|---|
| 4,727,168 | A | 2/1988 | Yoshino |
| 6,090,885 | A | 7/2000 | Kuo |
| 6,562,931 | B1 | 5/2003 | Knepper |
| 6,833,407 | B1 | 12/2004 | Ahmed |
| 6,984,262 | B2 | 1/2006 | King |
| 7,285,603 | B2 | 10/2007 | Vu |
| 8,263,185 | B2 | 9/2012 | Huck |
| 8,961,671 | B2 | 2/2015 | Sunder |
| 9,175,188 | B2 | 11/2015 | Buckanin |
| 9,334,408 | B2 | 5/2016 | Onai |
| 10,222,511 | B2 | 3/2019 | Berit-Debat |
| 10,370,499 | B2 | 8/2019 | Kumar |
| 10,457,835 | B2 | 10/2019 | Kirino |
| 11,059,970 | B2 | 7/2021 | Stanjek |
| 2003/0116872 | A1 | 6/2003 | Klemm |
| 2005/0279255 | A1 | 12/2005 | Suzuki |
| 2007/0232749 | A1 | 10/2007 | Ahmed |
| 2008/0026163 | A1 | 1/2008 | Hamaguchi |
| 2008/0076883 | A1 | 3/2008 | Takeuchi |
| 2008/0293865 | A1* | 11/2008 | Kameda .................. C08L 83/04 524/588 |
| 2011/0082254 | A1 | 4/2011 | Sepeur |
| 2015/0344698 | A1 | 12/2015 | Shustack |
| 2017/0267872 | A1 | 9/2017 | Tanino |
| 2017/0349783 | A1 | 12/2017 | Kirino |

FOREIGN PATENT DOCUMENTS

| | | |
|---|---|---|
| JP | 5350507 | 11/2013 |
| JP | 2018-080291 | 5/2018 |
| WO | WO 2000-037565 | 6/2000 |
| WO | WO 2006-114420 | 11/2006 |
| WO | WO 2010-098448 | 9/2010 |
| WO | WO 2014-120601 | 8/2014 |
| WO | WO 2019-022087 | 1/2019 |

OTHER PUBLICATIONS

International Search Report for PCT International Application No. PCT/IB2020/057227, mailed on Nov. 6, 2020, 5 pages.

"Manual of Production and Application of Modern Polymer Materials", Wang Duoren, Sinopec Press, May 31, 2002, pp. 91-92.

* cited by examiner

COMPOSITION INCLUDING A POLYORGANOSILOXANE AND AN AMINO-FUNCTIONAL SILANE AND METHOD OF USING THE SAME

BACKGROUND

In normal use, surfaces of motor vehicles, for example, are regularly exposed to weather effects such as rain, snow, sleet, ice formation, and other precipitation, as well as environmental contaminants (e.g., dirt, grime, dust, airborne pollutants, road surface residue, and bird and other animal waste). It is desirable to maintain the physical condition of these vehicles by cleaning or washing them and, in some cases, subsequently waxing and polishing or buffing them.

Many products that are intended to improve or restore a vehicle's finish are commercially available. A coating composition said to be useful for imparting water repellency, gloss, and durability to a surface, particularly on an automobile or other vehicle is described in U.S. Pat. Appl. Pub. No. 2017/0349783 (Kirino). A highly abrasion-resistant vehicle paint is described in U.S. Pat. Appl. Pub. No. 2011/0082254 (Sepeur et al.).

Certain compositions including polyorganosiloxanes having hydrolyzable groups have been reported to be useful for automotive coatings and are described in U.S. Pat. No. 9,334,408 (Onai), U.S. Pat. Appl. Pub. No. 2008/0026163 (Hamaguchi et al.), Int. Pat. Appl. Pub. No. WO 2014/120601 (Harkness et al.), and Japanese Patent Application 2018/080291 A, published May 24, 2018.

SUMMARY OF THE DISCLOSURE

In one aspect, the present disclosure provides a first polyorganosiloxane and at least one of an amino-functional silane or a cyclic azasilane. The first polyorganosiloxane has divalent units represented by formula:

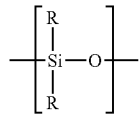

and greater than two $-Si(Y)_p(R)_{3-p}$ groups. In the first polyorganosiloxane, each R is independently alkyl, aryl, arylalkylenyl, or heterocycloalkylenyl, wherein alkyl and arylalkylenyl are unsubstituted or substituted with halogen and optionally interrupted by at least one catenated $-O-$, $-S-$, $-N(R^{11})-$, or combination thereof, wherein aryl, arylalkylenyl, and heterocycloalkyenyl are unsubstituted or substituted by at least one alkyl, alkoxy, halogen, or combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof; each Y is independently a hydrolysable group; and p is 1, 2, or 3. The amino-functional silane is represented by formula $(R^6)_2N-[R^4-Z]_r-R^4-[Si(Y)_p(R^5)_{3-p}]$, and the cyclic azasilane is represented by formula

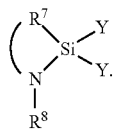

In these formulas, each $R^4$ is independently alkylene, arylene, or alkylene optionally interrupted or terminated by arylene; $R^5$ is alkyl, aryl, arylalkylenyl, or heterocycloalkylenyl, wherein aryl and arylalkylenyl are unsubstituted or substituted by at least one alkyl, alkoxy, or combination thereof; each Z is independently $-O-$ or $-N(R^6)-$; each $R^6$ is independently hydrogen, alkyl, aryl, arylalkylenyl, or $-R^4-[Si(Y)_p(R^5)_{3-p}]$, wherein aryl and arylalkylenyl are unsubstituted or substituted by at least one alkyl, alkoxy, or combination thereof; $R^7$ is an alkylene having 2 to 5 carbon atoms and is uninterrupted or interrupted by at least one catenated $-N(R^8)-$; each $R^8$ is independently hydrogen, alkyl, or alkenyl, wherein are unsubstituted or substituted by $-NR^1R^2$, wherein $R^1$ and $R^2$ are independently hydrogen or alkyl; each Y is independently a hydrolyzable group; r is 0, 1, 2, or 3; and p is 1, 2, or 3.

In another aspect, the present disclosure provides a method of making a coated article. The method includes applying the aforementioned composition on at least a portion of a surface of a substrate and allowing or inducing the composition to at least partially cure to form a first coating on at least a portion of the surface of the substrate.

In some embodiments, compositions of the present disclosure can provide high receding contact angles to water and low coefficients of friction even after scrubbing. The ability for the compositions to maintain such properties is surprisingly better than comparative compositions that have only two $-Si(Y)_p(R)_{3-p}$ groups.

As used herein:

The term "aliphatic group" means a saturated or unsaturated linear, branched, or cyclic hydrocarbon group. This term is used to encompass alkyl, alkenyl, and alkynyl groups, for example.

The term "alkyl" refers to a monovalent group that is a radical of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 30 carbon atoms. In some embodiments, the alkyl groups contain 1 to 20 carbon atoms, 1 to 10 carbon atoms, 1 to 6 carbon atoms, 1 to 4 carbon atoms, or 1 to 3 carbon atoms. Cyclic groups can be monocyclic or polycyclic and typically have from 3 to 10 ring carbon atoms. Examples of "alkyl" groups include methyl, ethyl, n-propyl, n-butyl, n-pentyl, isobutyl, t-butyl, isopropyl, n-octyl, n-heptyl, ethylhexyl, cyclopentyl, cyclohexyl, cycloheptyl, adamantyl, and norbornyl.

The term "alkylene" is the divalent or trivalent form of the "alkyl" groups defined above.

The term "amino group" is a functional group that consists of a nitrogen atom attached by single bonds to hydrogen atoms, alkyl groups, aryl groups, or a combination of these three. Primary amino groups include two hydrogen atoms bonded to the nitrogen, secondary amino groups include one hydrogen atom bonded to the nitrogen, and tertiary amino groups include no hydrogen atoms bonded to the nitrogen.

The term "aryl" refers to a monovalent group that is aromatic and, optionally, carbocyclic. The aryl has at least one aromatic ring. Any additional rings can be unsaturated, partially saturated, saturated, or aromatic. Optionally, the aromatic ring can have one or more additional carbocyclic rings that are fused to the aromatic ring. Unless otherwise indicated, the aryl groups typically contain from 6 to 30 carbon atoms and optionally contain at least one heteroatom (i.e., O, N, or S). In some embodiments, the aryl groups contain 6 to 20, 6 to 18, 6 to 16, 6 to 12, or 6 to 10 carbon atoms. Examples of an aryl group include phenyl, naphthyl, biphenyl, phenanthryl, anthracyl, and pyridinyl.

The term "arylene" is the divalent form of the "aryl" groups defined above.

"Arylalkylene" refers to an "alkylene" moiety to which an aryl group is attached.

"Arylalkylenyl" refers to a terminal aryl group attached to an "alkylene" moiety.

The term "catenated heteroatom" means an atom other than carbon (for example, oxygen, nitrogen, or sulfur) that replaces one or more carbon atoms in a carbon chain (for example, so as to form a carbon-heteroatom-carbon chain or a carbon-heteroatom-heteroatom-carbon chain).

The terms "cure" and "curable" refer to joining polymer chains together by covalent chemical bonds, usually via crosslinking molecules or groups, to form a network polymer. Therefore, in this disclosure the terms "cured" and "crosslinked" may be used interchangeably. A cured or crosslinked polymer is generally characterized by insolubility but may be swellable in the presence of an appropriate solvent. A "curable composition" refers to a composition that can be cured.

The term "epoxy group" refers to a functional group that consists of an oxygen atom joined by single bonds to two adjacent carbon atoms, thus forming the three-membered epoxide ring.

The term "fluoro-" (for example, in reference to a group or moiety, such as in the case of "fluoroalkylene" or "fluoroalkyl" or "fluorocarbon") or "fluorinated" can mean partially fluorinated such that there is at least one carbon-bonded hydrogen atom or perfluorinated.

The term "hydrolyzable group" or "hydrolyzable functional group" refer to a group that can react with water under conditions of atmospheric pressure. The reaction with water may optionally be catalyzed by acid or base. The hydrolyzable group is often converted to a hydroxyl group when it reacts. The hydroxyl group often undergoes further reactions (e.g., condensation reactions). As used herein, the term is often used in reference to one or more groups bonded to a silicon atom in a silyl group. Suitable hydrolyzable groups include halogen (e.g., iodo, bromo, chloro); alkoxy (e.g., —O-alkyl), aryloxy (e.g., —O-aryl), acyloxy (e.g., —O—C(O)-alkyl), amino (e.g., —N($R^1$)($R^2$), wherein each $R^1$ or $R^2$ is independently hydrogen or alkyl), polyalkyleneoxy; and oxime (e.g., —O—N=C—($R^1$)($R^2$).

The term "halogen" refers to a halogen atom or one or more halogen atoms, including chlorine, bromine, iodine, and fluorine atoms or fluoro, chloro, bromo, or iodo substituents.

The term "(meth)acrylate group" is a functional group that refers to an acrylate group of the formula $CH_2$=CH—C(O)O— and a methacrylate group of the formula $CH_2$=C($CH_3$)—C(O)O—.

The term "oligomer" means a molecule that comprises at least two repeat units and that has a molecular weight less than its entanglement molecular weight; such a molecule, unlike a polymer, exhibits a significant change in properties upon the removal or addition of a single repeat unit.

The term "oxy" means a divalent group or moiety of formula —O—.

The term "perfluoro-" (for example, in reference to a group or moiety, such as in the case of "perfluoroalkylene" or "perfluoroalkyl" or "perfluorocarbon") or "perfluorinated" means completely fluorinated such that, except as may be otherwise indicated, there are no carbon-bonded hydrogen atoms replaceable with fluorine.

The term "perfluoroether" means a group or moiety having two saturated or unsaturated perfluorocarbon groups (linear, branched, cyclic (e.g., alicyclic), or a combination thereof) linked with an oxygen atom (that is, there is at least one catenated oxygen atom).

The term "polyfluoropolyether" means a group having three or more saturated or unsaturated perfluorocarbon groups (linear, branched, cyclic (e.g., alicyclic), or a combination thereof) linked with oxygen atoms (that is, there are at least two catenated oxygen atoms).

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "some embodiments" means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION

Polyorganosiloxanes useful in the compositions of the present disclosure include oligomers and polymers that can be linear or branched. Useful oligomers and polymers include those that have random, alternating, block, or graft structures, or a combination thereof. When the composition is stored and applied, it typically does not have a network, cage, or crosslinked structure.

The composition of the present disclosure includes a first polyorganosiloxane comprising divalent units independently represented by formula X:

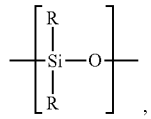

X wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N($R^{11}$)—, or combination thereof (in some embodiments, —O—, —S—, and combinations thereof, or —O—), wherein aryl, arylalkylenyl, and heterocycloalkyenyl are unsubstituted or substituted by at least one alkyl, alkoxy, halogen, or combination thereof. $R^{11}$ is hydrogen, alkyl, aryl, or arylalkylenyl, wherein aryl and arylalkylenyl are unsubstituted or substituted by at least one alkyl, alkoxy, or combination thereof. In some embodiments, $R^{11}$ is hydrogen or alkyl, for example, having 1 to 4 carbon atoms (e.g., methyl, ethyl, n-propyl, isopropyl, n-butyl, isobutyl, or sec-butyl). In some embodiments, $R^{11}$ is methyl or hydrogen. In some embodiments, the halogen or halogens on the alkyl, aryl, arylalkylenyl, or heterocycloalkyenyl groups is fluoro. R is generally considered a non-hydrolyzable group, which is not capable of being hydrolyzed under the conditions described above for hydrolyzing hydrolyzable groups.

When R is fluorinated, in some embodiments, R is $R_f C_j H_{2j}$—, wherein j is an integer of 2 to 8 (or 2 to 3), and $R_f$ is a fluorinated or perfluorinated alkyl group having 1 to 12 carbon atoms (or 1 to 6 carbon atoms); in some embodiments, R is $R_f' C_j H_{2j}$—, wherein j is an integer of 2 to 8 (or 2 to 3), and $R_f'$ is a fluorinated or perfluorinated polyether group having 1 to 45 carbon atoms (in some embodiments, 1 to 30 carbon atoms), aryl, and combinations thereof. In some embodiments, $R_f$ is a perfluoroalkyl group; and/or $R_f'$ is a perfluoropolyether group. Perfluoropolyether groups that can be linear, branched, cyclic, or a combination thereof. The perfluoropolyether group can be saturated or unsaturated (in some embodiments, saturated). Examples of useful perfluoropolyether groups include those that have —($C_pF_{2p}$)—, —($C_pF_{2p}$O)—, —(CF(RF))—, —(CF(RF)$C_pF_{2p}$O)—, —($C_pF_{2p}$CF(RF)O)—, or —($CF_2$CF(RF)O)— repeating units or combinations thereof, wherein p is an integer of 1 to 10 (or 1 to 8, or 1 to 6, or 1 to 4, or 1 to 3);

RF is selected from perfluoroalkyl, perfluoroether, perfluoropolyether, and perfluoroalkoxy groups that are linear, branched, cyclic, or a combination thereof and that have up to 12 carbon atoms, up to 10 carbon atoms, up to 8 carbon atoms, up to 6 carbon atoms, up to 4 carbon atoms, or up to 3 carbon atoms) and/or up to 4 oxygen atoms, up to 3 oxygen atoms, up to 2 oxygen atoms, or zero or one oxygen atom. In these perfluoropolyether structures, different repeating units can be combined in a block, alternating, or random arrangement to form the perfluoropolyether group.

The terminal group of the perfluoropolyether group can be ($C_pF_{2p+1}$)— or ($C_pF_{2p+1}$O)—, for example, wherein p is as defined above. Examples of useful perfluoropolyether groups include $C_3F_7O(CF(CF_3)CF_2O)_{n''}CF(CF_3)$—, $C_3F_7O(CF_2CF_2CF_2O)_{n''}CF_2CF_2$—, $CF_3O(C_2F_4O)_{n''}CF_2$—, $CF_3O(CF_2O)_{n''}(C_2F_4O)_qCF_2$—, and $F(CF_2)_3O(C_3F_6O)_q(CF_2)_3$—, wherein n" has an average value of 0 to 50, or 1 to 50, or 3 to 30, or 3 to 15, or 3 to 10; and q has an average value of 0 to 50, or 3 to 30, or 3 to 15, or 3 to 10.

In some embodiments, the perfluoropolyether group comprises at least one divalent hexafluoropropyleneoxy group (—CF(CF_3)—CF_2O—). Perfluoropolyether groups can include $F[CF(CF_3)CF_2O]_aCF(CF_3)$— (or, as represented above, $C_3F_7O(CF(CF_3)CF_2O)_nCF(CF_3)$, where n+1=a), wherein a has an average value of 4 to 20. Such perfluoropolyether groups can be obtained through the oligomerization of hexafluoropropylene oxide.

In some embodiments, each R is independently alkyl, aryl, or alkyl substituted by fluoro and optionally interrupted by at least one catenated —O— group. Suitable alkyl groups for R in formula X typically have 1 to 10, 1 to 6, or 1 to 4 carbon atoms. Examples of useful alkyl groups include methyl, ethyl, isopropyl, n-propyl, n-butyl, and iso-butyl. In some embodiments, each R is independently alkyl having up to six (in some embodiments, up to 4, 3, or 2) carbon atoms, $F[CF(CF_3)CF_2O]_aCF(CF_3)C_jH_{2j}$— (wherein j is an integer of 2 to 8 (or 2 to 3) and a has an average value of 4 to 20), $C_4F_9C_3H_6$—, $C_4F_9C_2H_4$—, $C_4F_9OC_3H_6$—, $C_6F_{13}C_3H_6$—, $CF_3C_3H_6$—, $CF_3C_2H_4$—, phenyl, benzyl, or $C_6H_5C_2H_4$—. In some embodiments, each R is independently methyl or phenyl. In some embodiments, each R is methyl.

The first polyorganosiloxane in the composition of the present disclosure has more than two (in some embodiments, at least 2.1, 2.2, 2.3, 2.4, 2.5. 2.6, 2.7, 2.8, 2.9, 3, or more) —Si(Y)$_p$(R)$_{3-p}$ groups, wherein Y is a hydrolyzable group, R is as defined above in any of its embodiments, and p is 1, 2, or 3 (in some embodiments, 2 or 3, or 3). Suitable hydrolyzable groups include alkoxy (e.g., —O-alkyl), aryloxy (e.g., —O-aryl), acyloxy (e.g., —O—C(O)-alkyl), amino (e.g., —N($R^1$)($R^2$), wherein each $R^1$ or $R^2$ is independently hydrogen or alkyl), oxime (e.g., —O—N=C($R^1$)($R^2$); or polyalkyleneoxy (e.g., -[EO]$_h$—[$R^9$O]$_i$-[EO]$_h$—$R^{9'}$ or —[$R^9$O]$_i$-[EO]$_h$—[$R^9$O]$_i$—$R^{9'}$, wherein EO represents —CH$_2$CH$_2$O—; each $R^9$O independently represents —CH(CH$_3$)CH$_2$O—, —CH$_2$CH(CH$_3$)O—, —CH(CH$_2$CH$_3$)CH$_2$O—, —CH$_2$CH(CH$_2$CH$_3$)O—, or —CH$_2$C(CH$_3$)$_2$O— (in some embodiments, —CH(CH$_3$)CH$_2$O— or —CH$_2$CH(CH$_3$)O—), each h is independently a number from 1 to 150 (in some embodiments, from 7 to about 150, 14 to about 125, 5 to 15, or 9 to 13); and each i is independently a number from 0 to 55 (in some embodiments, from about 21 to about 54, 15 to 25, 9 to about 25, or 19 to 23); and wherein $R^{9'}$ is hydrogen or alkyl having up to four carbon atoms). Alkoxy and acyloxy are optionally substituted by halogen, and aryloxy is optionally substituted by halogen, alkyl (e.g., having up to 4 carbon atoms), or haloalkyl. In some embodiments, alkoxy and acyloxy have up to 18 (or up to 12, 6, or 4) carbon atoms. In some embodiments, aryloxy has 6 to 12 (or 6 to 10) carbon atoms. In some embodiments, each Y is independently alkoxy, aryloxy, or acyloxy. In some embodiments, each Y is independently alkoxy having up to ten carbon atoms. In some of these embodiments, each Y is independently alkoxy having from 1 to 6 (e.g., 1 to 4) carbon atoms. In some of these embodiments, each Y is independently methoxy or ethoxy.

The more than two (in some embodiments, at least 2.1, 2.2, 2.3, 2.4, 2.5. 2.6, 2.7, 2.8, 2.9, 3, or more) —Si(Y)$_p$(R)$_{3-p}$ groups may be pendent groups, terminal groups, or a combination of pendent and terminal groups. In some embodiments, the —Si(Y)$_p$(R)$_{3-p}$ groups are pendent groups. In some embodiments, the first polyorganosiloxane is terminated with —Si(R)$_3$ groups, wherein R is defined as above in any of its embodiments. In some embodiments, the polyorganosiloxane has up to 10, 9, 8, 7, 6, or 5 —Si(Y)$_p$(R)$_{3-p}$ groups. Since polyorganosiloxanes typically include a distribution of molecular weights and structures, it should be understood that the first polyorganosiloxane has an average of more than two —Si(Y)$_p$(R)$_{3-p}$ groups in the polymer. In some embodiments, the ratio of divalent units represented by formula X to —Si(Y)$_p$(R)$_{3-p}$ groups is at least 4, 5, 10 and up to 400, 300, 200, 100, or 75.

In some embodiments, the first polyorganosiloxane in the composition of the present disclosure comprises (m) terminal units represented by formula -Q-Si(Y)$_p$(R)$_{3-p}$ and (n) divalent units represented by formula XI:

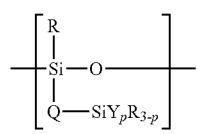   XI wherein (n) is at least 1, (m) is 0, 1, 2, or more, and (m)+(n) is greater than 2 (in some embodiments, at least 2.1, 2.2, 2.3, 2.4, 2.5. 2.6, 2.7, 2.8, 2.9, 3, or more). In some embodiments, (m)+(n) is in a range from 3 to 10, 3 to 8, or 3 to 6. In some embodiments, the first polyorganosiloxane includes the divalent units represented by formula XI. In formula XI, each R is independently as defined above for a divalent unit of formula X, each Y and p as defined above in any of its embodiments, and each Q is independently alkylene, arylene, or alkylene that is at least one of interrupted or terminated by aryl, wherein the alkylene, arylene, and alkylene that is at least one of interrupted or terminated by aryl are optionally at least one of interrupted or terminated by at least one ether (i.e., —O—), thioether (i.e., —S—), amine (i.e., —NR$^{11}$—), amide (i.e., —N(R$^{11}$)—C(O)— or —C(O)—N(R$^{11}$)—), ester (i.e., —O—C(O)— or —C(O)—O—), thioester (i.e., —S—C(O)— or —C(O)—S—), carbonate (i.e., —O—C(O)—O—), thiocarbonate (i.e., —S—C(O)—O— or —O—C(O)—S—), carbamate (i.e., —(R$^{11}$)N—C(O)—O— or —O—C(O)—N(R$^{11}$)—, thiocarbamate (i.e., —N(R or —S—C(O)—N(R$^{11}$)—, urea C(O)—N(R$^{11}$)—), thiourea (i.e., —(R$^{11}$)N—C(S)—N(R$^{11}$)). In any of these groups that include an is hydrogen, alkyl, aryl, or arylalkylenyl, wherein aryl and arylalkylenyl are unsubstituted or substituted by at least one alkyl, alkoxy, or combination thereof. In some embodiments, R$^{11}$ is hydrogen or alkyl, for example, having 1 to 4 carbon atoms (e.g., methyl, ethyl, n-propyl, isopropyl, n-butyl, isobutyl, or sec-butyl). In some embodiments, is methyl or hydrogen. The phrase "interrupted by at least one functional group" refers to having part of the alkylene, arylalkylene, or alkylarylene group on either side of the functional group. An example of an alkylene interrupted by an ether is —CH$_2$—CH$_2$—O—CH$_2$—CH$_2$—. Similarly, an alkylene that is interrupted by arylene has part of the alkylene on either side of the arylene (e.g., —CH$_2$—CH$_2$—C$_6$H$_4$—CH$_2$—). In some embodiments, each Q is independently alkylene that is optionally at least one of interrupted or terminated by at least one ether, thioether, or combination thereof. The alkylene can have 1 to 10, 1 to 6, or 1 to 4 carbon atoms. In some embodiments, Q is alkylene having 1 to 10, 1 to 6, 1 to 4, 1 to 3, or 1 to 2 carbon atoms. In some embodiments, Q is a poly(alkylene oxide) group. Suitable poly(alkylene oxide) groups include those represented by formula (OR$^{10}$)$_{a'}$, in which each OR$^{10}$ is independently —CH$_2$CH$_2$O—, —CH(CH$_3$)CH$_2$O—, CH$_2$CH$_2$CH$_2$O—, —CH$_2$CH(CH$_3$)O—, —CH$_2$CH$_2$CH$_2$CH$_2$O—, —CH(CH$_2$CH$_3$)CH$_2$O—, —CH$_2$CH(CH$_2$CH$_3$)O—, and —CH$_2$C(CH$_3$)$_2$O—. In some embodiments, each OR$^{10}$ independently represents —CH$_2$CH$_2$O—, —CH(CH$_3$)CH$_2$O— or —CH$_2$CH(CH$_3$)O—. Each a' is independently a value from 5 to 300 (in some embodiments, from 10 to about 250, or from 20 to about 200).

In some embodiments, the first polyorganosiloxane in the composition of the present disclosure comprises a terminal unit represented by formula -Q-Si(Y)$_p$(R)$_{3-p}$, wherein Q, R, and p are as defined above in any of their embodiments. For terminal -Q-Si(Y)$_p$(R)$_{3-p}$ groups, Q may also be a bond. In some embodiments, the polysiloxane includes one terminal unit represented by formula -Q-Si(Y)$_p$(R)$_{3-p}$. In some embodiments, the polysiloxane includes two terminal units represented by formula -Q-Si(Y)$_p$(R)$_{3-p}$. If the polysiloxane is branched, it can include more than two terminal units represented by formula -Q-Si(Y)$_p$(R)$_{3-p}$. In some embodiments, the polysiloxane includes at least one terminal unit represented by formula -Q-Si(Y)$_p$(R)$_{3-p}$.

In some embodiments, the first polyorganosiloxane in the composition of the present disclosure is represented by formula XII.

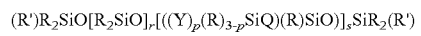   XII

In formula XII, each R' is independently R or a terminal unit represented by formula -Q-Si(Y)$_p$(R)$_{3-p}$; R, Y, Q, and p are as defined above in any of their embodiments, s is at least 1, and r+s is in a range from 10 to 1000, 10 to 500, 10 to 400, 10 to 300, 12 to 300, 13 to 300, 13 to 200, 10 to 100, 10 to 50, or 10 to 30. In some embodiments when s is 1, each R' is independently represented by formula -Q-Si(Y)$_p$(R)$_{3-p}$. In some embodiments of formula XII, at least 40 percent, and in some embodiments at least 50 percent, of the R groups are phenyl, methyl, or combinations thereof. For example, at least 60 percent, at least 70 percent, at least 80 percent, at least 90 percent, at least 95 percent, at least 98 percent, or at least 99 percent of the R groups can be phenyl, methyl, or combinations thereof. In some embodiments of formula XII, at least 40 percent, and in some embodiments at least 50 percent, of the R groups are methyl. For example, at least 60 percent, at least 70 percent, at least 80 percent, at least 90 percent, at least 95 percent, at least 98 percent, or at least 99 percent of the R groups can be methyl. In some embodiments, each R is methyl. Although formula XII is shown as a block copolymer, it should be understood that the divalent units of formulas X and XI can be randomly positioned in the copolymer. Thus, polyorganosiloxanes useful for practicing the present disclosure also include random copolymers.

In some embodiments, the ratio of r units to s units and R' groups represented by -Q-Si(Y)$_p$(R)$_{3-p}$ or Y is at least 4, 5, 10 and up to 400, 300, 200, 100, or 75.

In some embodiments, the first polyorganosiloxane in the composition of the present disclosure includes at least one divalent unit represented by formula XV

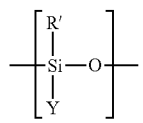

wherein Y is as defined above in any of its embodiments, and R' is R or Y. In some embodiments, the first polyorganosiloxane has at least one —Si(R')$_2$(Y) end group, where R' is R or Y, and Y is as defined above in any of its embodiments. In some embodiments, each Y is independently alkoxy, aryloxy, or acyloxy. In some embodiments, each Y is independently alkoxy having up to ten carbon atoms. In some of these embodiments, each Y is independently alkoxy having from 1 to 6 (e.g., 1 to 4) carbon atoms. In some of these embodiments, each Y is independently methoxy or ethoxy. In some embodiments, each R' is independently phenyl or methyl. In some embodiments, each R' is methyl.

While some units represented by formula XV may be present and while the first polyorganosiloxane may be branched in some embodiments, the first polyorganosiloxane is not considered a silsesquioxane. In some embodiments, the first polyorganosiloxane has less than 10 percent, less than 5 percent, less than 2.5 percent, or less than 1 percent by weight units represented by formula RSiO3/2, based on the total weight of the first polyorganosiloxane.

In some embodiments of the first polyorganosiloxane in the composition of the present disclosure, each Y is methoxy. In some embodiments, the weight percent of methoxy groups in the first polyorganosiloxane is not more than 25%, 20%, 15%, 10%, or 5%, based on the total weight of the polyorangosiloxane. In some embodiments, the weight percent of methoxy groups in the first polyorganosiloxane is at least 0.05%, 0.1%, 0.5%, 1.0%, or 1.5%, based on the total weight of the polyorangosiloxane.

In some embodiments, the composition of the present disclosure includes at least 1 weight percent (wt. %), at least 5 wt. %, at least 10 wt. %, at least 50 wt. %, or at least 60 wt. % of the first polyorganosiloxane, based on the total weight of the composition. In some embodiments, the composition includes up to 99 wt. %, up to 95 wt. %, or up to 90 wt. % of the first polyorganosiloxane, based on the total weight of the composition. In embodiments that include solvent and/or water, any of these percentages can be based on the total weight of the solids in the composition (that is, excluding solvent and/or water).

The polysiloxanes can be prepared by known synthetic methods, and many are commercially available (for example, from Wacker Chemie AG, Munich, Germany, Shin-Etsu Chemical, Tokyo, Japan, Dow Corning Corporation, or from Gelest, Inc. (see, for example, the polysiloxanes described in *Silicon Compounds: Silanes and Silicones*, Second Edition, edited by B. Arkles and G. Larson, Gelest, Inc. (2008))). Polyorganosiloxanes can be prepared by using known synthetic methods including the platinum-catalyzed addition reaction of an olefin (e.g., vinyltrimethoxysilane) and a hydrosiloxane (small molecule, oligomer, or polymer). Further examples of synthetic methods are described in the Examples, below.

In some embodiments, the first polyorganosiloxane in the composition of the present disclosure has a number average molecular weight of at least 300 grams per mole, at least 500 grams per mole, at least 1000 grams per mole, at least 2000 grams per mole, at least 3000 grams per mole, at least 4000 grams per mole, or at least 5000 grams per mole. Polysiloxanes disclosed herein typically have a distribution of molecular weights. The number and type of repeating units, end groups, and the molecular weights of polysiloxanes can be determined, for example, by nuclear magnetic resonance (NMR) spectroscopy (including $^{29}$Si NMR spectroscopy) using techniques known to one of skill in the art. The number of —Si(Y)$_p$(R)$_{3-p}$ groups in a polyorganosiloxane can be determined by NMR. Molecular weights, particularly for higher molecular-weight materials, including number average molecular weights and weight average molecular weights, can also be measured, for example, by gel permeation chromatography (i.e., size exclusion chromatography) using techniques known to one of skill in the art.

In some embodiments, the composition of the present disclosure includes an amino-functional silane represented by formula XX:

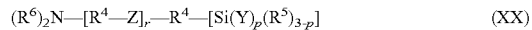

In formula XX, each R$^4$ is independently alkylene, arylene, or alkylene interrupted or terminated by arylene. In some embodiments, each R$^4$ is independently a divalent alkylene group. In some embodiments, each R$^4$ is independently a divalent alkylene group having up to 6 (in some embodiments, 5, 4, or 3) carbon atoms. Each Z is independently —O— or —NR$^6$—, and r is 0, 1, 2, or 3. In some embodiments, r is 0. In some embodiments, each Z is —NR$^6$—. In some embodiments, r is 1, 2, or 3. In some embodiments, r is 1 or 2. In embodiments in which r is 1, 2, or 3, the second amino-functional silane includes diamino-functional silanes, triamino-functional silanes, and tetraamino-functional silanes, for example. In some embodiments in which r is greater than 0, —[R$^4$—Z]$_r$—R$^4$— is represented by formula —CH$_2$—CH$_2$—N(R$^6$)—CH$_2$—CH$_2$—CH$_2$— or —CH$_2$—CH$_2$—N(R$^6$)—CH$_2$—CH$_2$—N(R$^6$)—CH$_2$—CH$_2$—CH$_2$—.

In formula XX, each R$^5$ can independently be alkyl, aryl, or alkylenyl interrupted or terminated by aryl. In some embodiments, R$^5$ is alkyl or arylalkylenyl. In some of these embodiments, R$^5$ is alkyl (e.g., methyl or ethyl).

In formula XX, each R$^6$ is independently hydrogen, alkyl, aryl, alkylenyl interrupted or terminated by aryl, or —R$^4$—[Si(Y)$_p$(R$^5$)$_{3-p}$], where R$^4$ is defined as in any of the above embodiments. In some embodiments, one R$^6$ group is hydrogen or alkyl, and the other R$^6$ group is —R$^4$—[Si(Y)$_p$(R$^5$)$_{3-p}$]. In some of these embodiments, one R$^6$ group is alkyl, and the other R$^6$ group is —R$^4$—[Si(Y)$_p$(R$^5$)$_{3-p}$]. In some of these embodiments, alkyl may have up to 6 (in some embodiments, up to 5, 4, 3, or 2) carbon atoms. In some embodiments, one R$^6$ group is hydrogen or methyl, and the other R$^6$ group is —R$^4$—[Si(Y)$_p$(R$^5$)$_{3-p}$]. In some of these embodiments, one R$^6$ group is hydrogen, and the other R$^6$ group is —R$^4$—[Si(Y)$_p$(R$^5$)$_{3-p}$]. In some embodiments, each R$^6$ is hydrogen. In some embodiments, at least one R$^6$ is alkyl having up to 6 (in some embodiments, up to 5, 4, 3, or 2) carbon atoms. In some embodiments, one R$^6$ is methyl and one R$^6$ is hydrogen.

In formula XX, Y and p are independently defined as above for formula X, in any of their embodiments.

Examples of amino-functional silanes suitable for the composition of the present disclosure include 3-aminopropyltrimethoxysilane, 3-aminopropyltriethoxysilane, bis(3-trimethoxysilylpropyl)amine, bis(3-triethoxysilylpropyl)amine, N-methyl-bis(3-trimethoxysilylpropyl)amine, N-methyl-bis(3-triethoxysilylpropyl)amine, [3-(2-aminoethylamino)propyl]trimethoxysilane, 3-[2-(2-aminoethylamino)ethylamino]propyltrimethoxysilane, [3-(2-aminoethylamino)propyl]triethoxysilane, 3-[2-(2-aminoethylamino)ethylamino]propyltriethoxysilane, N,N'-bis[3-trimethoxysilylpropyl]-ethylenediamine, N,N-bis[3-trimethoxysilylpropyl]-ethylenediamine, and combinations thereof.

In some embodiments, the composition of the present disclosure includes a cyclic azasilane. Such compounds may be represented by the following formula XXIII.

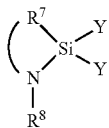

XXIII

In formula XXIII, $R^7$ is an alkylene having 2 to 5 carbon atoms and is uninterrupted or interrupted by at least one catenated —$N(R^8)$—, wherein each $R^8$ is independently hydrogen, alkyl, or alkenyl, in some embodiments, having up to 12, 6, 4, 3, or 2 carbon atoms and unsubstituted or substituted by —$N(R^6)_2$, wherein is $R^6$ is independently as defined above; and each Y is independently as defined above in any of its embodiments in connection with formula X. Examples of suitable cyclic azasilanes include 2,2-dimethoxy-N-butyl-1-aza-2-silacyclopentane, 2-methyl-2-methoxy-N-(2-aminoethyl)-1-aza-2-silacyclopentane, 2,2-diethoxy-N-(2-aminoethyl)-1-aza-2-silacyclopentane, 2,2-dimethyl-N-allyl-1-aza-2-silacyclopentane, 2,2-dimethoxy-N-methyl-1-aza-2-silacyclopentane, 2,2-diethoxy-1-aza-2-silacyclopentane, 2,2-dimethoxy-1,6-diaza-2-silacyclooctane, and N-methyl-1-aza-2,2,4-trimethylsilacyclopentane.

The composition of the present disclosure includes at least one of an amino-functional silane of formula XX or cyclic azasilane of formula XXIII. In some embodiments, the composition includes the amino-functional silane. In some embodiments, the composition includes the cyclic azasilane. In some embodiments, the composition includes both the amino-functional silane and the cyclic azasilane.

In some embodiments, the composition of the present disclosure includes at least 1 wt. %, at least 0.1 wt. %, at least 0.01 wt. %, or at least 0.001 wt. % of at least one of the amino-functional silane or cyclic azasilane, including any of those described above, based on the total weight of the composition. In some embodiments, the composition includes up to 10 wt. %, up to 5 wt. %, or up to 1 wt. % of at least one of the amino-functional silane or cyclic azasilane, including any of those described above, based on the total weight of the composition. In embodiments that include solvent and/or water, any of these percentages can be based on the total weight of the solids in the composition (that is, excluding solvent and/or water).

The composition of the present disclosure can include polyorganosiloxanes other than the first polyorganosiloxane described above. Other polyorganosiloxanes in the composition may or may not include reactive functional groups (e.g., hydrolyzable, vinyl, mercapto, amino, hydroxyl, or hydride functional groups).

In some embodiments, the composition of the present disclosure includes a second polyorganosiloxane comprising divalent units represented by formula: formula X:

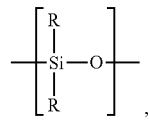

X wherein each R is independently as defined above in any of its embodiments, wherein the second polyorganosiloxane does not include hydrolyzable groups. The second polyorganosiloxane may be a linear polyorganosiloxane consisting of divalent units represented by formula X and terminal —$Si(R)_3$ groups, wherein each R is independently as defined above in any of its embodiments. In some embodiments, each R is methyl. In some embodiments, the second polyorganosiloxane is a polydimethylsiloxane having no reactive functional groups.

In some embodiments, the composition of the present disclosure includes a third polyorganosiloxane comprising divalent units represented by formula: formula X:

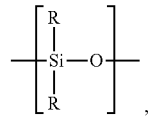

X wherein each R is independently as defined above in any of its embodiments, wherein the second polyorganosiloxane has at least one, in some embodiments, two —$Si(Y)_p(R)_{3-p}$ groups, wherein Y is a hydrolyzable group, R is as defined above in any of its embodiments, and p is 1, 2, or 3 (in some embodiments, 2 or 3, or 3). Suitable hydrolyzable groups include any of those described above for the first polyorganosiloxane. In some embodiments, each Y is independently alkoxy, aryloxy, or acyloxy. In some embodiments, each Y is independently alkoxy having up to ten carbon atoms. In some of these embodiments, each Y is independently alkoxy having from 1 to 6 (e.g., 1 to 4) carbon atoms. In some of these embodiments, each Y is independently methoxy or ethoxy. A third polyorganosiloxane can be combined with a first polyorganosiloxane having at least three —$Si(Y)_p(R)_{3-p}$ groups in ratios such that polyorganosiloxane composition overall still has an average of greater than two —$Si(Y)_p(R)_{3-p}$ groups.

A wide variety of molecular weights may be suitable for the second or third polyorganosiloxanes useful for the composition of the present disclosure, depending upon, for example, the properties desired for the composition. In some embodiments, second or third polyorganosiloxanes useful for practicing the present disclosure have a weight average molecular weight of 100 grams per mole to 100,000 grams per mole.

If the composition includes at least one of the second or third polyorganosiloxane, in some embodiments, the composition of the present disclosure includes at least 0.01 wt. %, at least 0.1 wt. %, or at least 1 wt. % of at least one of the second or third polyorganosiloxane, including any of those described above, based on the total weight of the composition. In some embodiments, the composition includes up to 10 wt. %, up to 5 wt. %, or up to 1 wt. % of at least one of the second or third polyorganosiloxane, including any of those described above, based on the total weight of the composition. In embodiments that include solvent and/or water, any of these percentages can be based on the total weight of the solids in the composition (i.e., excluding solvent and/or water). In some embodiments, the composition does not include the second or third polyorganosiloxane.

In some embodiments, the composition of the present disclosure includes a catalyst, for example, for the hydrolysis of the hydrolyzable groups in the first polyorganosiloxane, amino-functional silane, cyclic azasilane, and optionally third polyorganosiloxane. In some embodiments, the catalyst is an acid. Suitable acid catalysts include acetic acid, chloroacetic acid, dichloroacetic acid, trichloroacetic acid, trifluoroacetic acid, citric acid, formic acid, triflic acid, perfluorobutylsulfonic acid, dinonylnaphthalene sulfonic acid, dinonylnaphthalene disulfonic acid, perfluorobutyric acid, p-toluenesulfonic acid, dodecylsulfonic acid, dodecylbenzenesulfonic acid, benzenesulfonic acid, methanesulfonic acid, sulfuric acid, hydrochloric acid, phosphoric acid, and nitric acid. The catalyst can also be a Lewis acid, such as boron compounds such as boron trifluoride, boron tribromide, triphenylborane, triethylborane, and tris(pentafluorophenyl)borane. In some embodiments the catalyst is a base. Examples of useful base catalysts include alkali metal hydroxides, tetraalkylammonium hydroxides, ammonia, hydoxylamine, imidazole, pyridine, N-methylimidazole, diethylhydroxylamine, morpholine, N-methyl morpholine, and other amine compounds. In some embodiment, the catalyst is a strong neutral organic base such as an amidine, guanidine, phosphazene, or proazaphosphatrane, as described in U.S. Pat. No. 9,175,188 B2 (Buckanin et. al). In some embodiments, the catalyst is an organometallic compound. Suitable catalysts include alkoxides, carboxylates, acetyl acetonates, and other chelates of Sn, Al, Bi, Pb, Zn, Ca, V, Fe, Ti, K, Ba, Mn, Ni, Co, Ce, and Zr, for example. Some examples include dibutyl tin dilaurate, dibutyl tin diacetate, dibutyl tin dichloride, dibutyl tin dibromide, dibutyl tin bis(acetylacetonate), dibutyl tin dioxide, dibutyl tin dioctoate, tin (II) octoate, tin (II) neodecanoate, tetraisopropoxy titanium, tetra-n-butoxytitanium, titanium tetrakis (2-ethylhexoxy), triethanolamine titanate chelate, titanium diisopropoxide (bis-2,4-pentanedionate), aluminum tris (acetylacetonate), aluminum titanate, zinc ethylhexanoate, aluminum tris(ethylacetoacetate), diisopropocyaluminumethyl acetoacetate; bismuth tris(2-ethylhexonate), bismuth tris(neodecanoate); zirconium tetra-acetylacetonate and titanium tetra-acetylactonate, lead octylate, and K-Kat 670 (King Industries, Norwalk Conn.).

If the composition includes a catalyst, in some embodiments, the composition of the present disclosure includes at least 0.1 wt. %, at least 0.01 wt. %, or at least 0.001 wt. % of a catalyst, including any of those described above, based on the total weight of the composition. In some embodiments, the composition includes up to 5 wt. %, up to 2.5 wt. %, or up to 1 wt. % of a catalyst, including any of those described above, based on the total weight of the composition. In embodiments that include solvent and/or water, any of these percentages can be based on the total weight of the solids in the composition (i.e., excluding solvent and/or water).

In some embodiments, the composition of the present disclosure includes at least one additional silane having hydrolyzable functionality. The silane can be useful, for example, as a crosslinker and/or diluent. In some embodiments, the composition of the present disclosure includes a mixture of silanes having hydrolyzable functionality.

In some embodiments, the silane is represented by formula XXV.

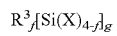   XXV wherein g is 1 to 6, f is 0, 1, or 2, with the proviso that when f is 0, g is 1; each $R^3$ is monovalent or multivalent, and is independently alkyl, aryl, or arylalkylenyl, wherein alkyl and arylalkylenyl are each uninterrupted or interrupted with at least one catenated —O—, —N($R^{11}$)—, —S—, —P—, —Si— or combination thereof, wherein aryl and arylalkylenyl are each unsubstituted or substituted by alkyl or alkoxy, and wherein alkyl, aryl, and arylalkylenyl are each unsubstituted or substituted with at least one epoxy, thiol (i.e., —SH), (meth)acrylate, vinyl (i.e., —CH=$CH_2$), allyl (i.e., $H_2$C=CH—$CH_2$—), isocyanate (i.e., —N=C=O), thiocyanate (i.e., —S=C=N), ureido (e.g., —NH—C(O)—$NH_2$), chloro (i.e., —Cl), or a combination thereof; and each X is a hydrolysable group. $R^{11}$ is hydrogen, alkyl, aryl, or arylalkylenyl, wherein aryl and arylalkylenyl are unsubstituted or substituted by at least one alkyl, alkoxy, or combination thereof. In some embodiments, $R^{11}$ is hydrogen or alkyl, for example, having 1 to 4 carbon atoms (e.g., methyl, ethyl, n-propyl, isopropyl, n-butyl, isobutyl, or sec-butyl). In some embodiments, $R^{11}$ is methyl or hydrogen.

In some embodiments, each X is independently a halide (i.e., fluoride, chloride, bromide, or iodine), hydroxyl (i.e., —OH), alkoxy (e.g., —O-alkyl), aryloxy (e.g., —O-aryl), acyloxy (e.g., —O—C(O)-alkyl), amino (e.g., —N($R^1$)($R^2$), wherein each $R^1$ or $R^2$ is independently hydrogen or alkyl), oxine (e.g., —O—N=($R^1$)($R^2$)) or polyalkyleneoxy (e.g., -[EO]$_h$—[$R^9$O]$_i$-[EO]$_h$—$R^{9\prime}$ or —[$R^9$O]$_i$-[EO]$_h$—[$R^9$O]$_i$—$R^{9\prime}$, wherein EO represents —$CH_2CH_2$O—; each $R^9$O independently represents —CH($CH_3$)$CH_2$O—, —$CH_2$CH($CH_3$)O—, —CH($CH_2CH_3$)$CH_2$O—, —$CH_2$CH($CH_2CH_3$)O—, or —$CH_2$C($CH_3$)$_2$O— (in some embodiments, —CH($CH_3$)$CH_2$O— or —$CH_2$CH($CH_3$)O—), each h is independently a number from 1 to 150 (in some embodiments, from 7 to about 150, 14 to about 125, 5 to 15, or 9 to 13); and each i is independently a number from 0 to 55 (in some embodiments, from about 21 to about 54, 15 to 25, 9 to about 25, or 19 to 23); and wherein $R^{9\prime}$ is hydrogen or alkyl having up to four carbon atoms). Alkoxy and acyloxy are optionally substituted by halogen, and aryloxy is optionally substituted by halogen, alkyl (e.g., having up to 4 carbon atoms), or haloalkyl. In some embodiments, alkoxy and acyloxy have up to 18 (or up to 12, 6, or 4) carbon atoms. In some embodiments, aryloxy has 6 to 12 (or 6 to 10) carbon atoms. In some embodiments, each X is independently selected from the group consisting of halide, hydroxyl, alkoxy, aryloxy, and acyloxy. In some embodiments, each X is independently hydroxyl, alkoxy, amino, acetoxy, aryloxy, or halogen. In some embodiments, each X is independently selected from the group consisting of halide (e.g., chloride), amino, and alkoxy having up to ten carbon atoms. In some of these embodiments, each X is independently alkoxy having from 1 to 6 (e.g., 1 to 4) carbon atoms. In some of these embodiments, each X is independently methoxy or ethoxy. In some embodiments, each X of formula XXV is independently —O$R^1$, wherein $R^1$ is hydrogen or a ($C_1$-$C_{18}$) alkyl, or —N$R^1R^2$ (wherein each $R^1$ and $R^2$ is independently hydrogen or a ($C_1$-$C_{18}$)alkyl, in some embodiments, ($C_1$—$C_{12}$)alkyl, ($C_1$-$C_8$)alkyl, or ($C_1$-$C_4$)alkyl. In some embodiments, each X is independently O$R^1$ (wherein $R^1$ hydrogen or a ($C_1$-$C_{18}$)alkyl), in some embodiments, ($C_1$-$C_{12}$)alkyl, ($C_1$-$C_8$)alkyl, or ($C_1$-$C_4$)alkyl. In some embodiments, each $R^3$ is methyl.

In formula XXV, $R^3$ can include a straight chain, branched, or cyclic group, or a combination thereof. In some embodiments, each $R^3$ independently includes 1 to 18, 1 to 12, 1 to 8, 1 to 6, or 2 to 6 carbon atoms. In some embodiments, each $R^3$ is independently alkyl having 1 to 18, 1 to 12, 1 to 6, or 2 to 6 carbon atoms. In some embodiments, each $R^3$ includes at least one catenated oxygen atom. In some embodiments, each $R^3$ is independently alkyl having at least one catenated oxygen atom. In some embodiments, each $R^3$ includes at least one epoxy, thiol, (meth)acrylate, vinyl, allyl, isocyanate, thiocyanate, ureido, or chloro group or a combination thereof.

In some embodiments of formula XXV, g is 1 or 2. In some embodiments, g is 1.

In some embodiments of formula XXV, f is 1.

Useful silanes represented by formula XXV include methacryloxypropyltrimethoxysilane, 3-glycidoxypropyltrimethoxysilane, isooctyltrimethoxysilane, 3-mercaptopropyltrimethoxysilane, isobutyltrimethoxysilane, and tetraethyl orthosilicate.

In some embodiments, the silane in the composition is represented by formula XXVI.

$$L-[R^{3b}-Si(X)_{3-f}(R^{3a})_f]_{g'} \quad \text{XXVI}$$

In formula XXVI, X is as defined above in any of its embodiments described in connection with formula XXV. $R^{3a}$ is monovalent alkyl, aryl, arylalkylenyl, wherein alkyl and arylalkylenyl are each uninterrupted or interrupted with at least one catenated —O—, —N($R^{11}$)—, —S—, —P—, —Si— or combination thereof, and wherein aryl and arylalkylenyl are each unsubstituted or substituted by alkyl or alkoxy. $R^{3b}$ is divalent alkylene, arylene, or arylalkylene, wherein alkylene and arylalkylene are each uninterrupted or interrupted with at least one catenated —O—, —N($R^{11}$)—, —S—, —P—, —Si— or combination thereof, and wherein arylene and arylalkylene are each unsubstituted or substituted by alkyl or alkoxy. $R^{11}$ is hydrogen, alkyl, aryl, or arylalkylenyl, wherein aryl and arylalkylenyl are unsubstituted or substituted by at least one alkyl, alkoxy, or combination thereof. In some embodiments, $R^{11}$ is hydrogen or alkyl, for example, having 1 to 4 carbon atoms (e.g., methyl, ethyl, n-propyl, isopropyl, n-butyl, isobutyl, or sec-butyl). In some embodiments, $R^{11}$ is methyl or hydrogen. L is epoxy, thiol, (meth)acrylate, vinyl, allyl, isocyanate, thiocyanate, ureido, or chloro. In formula f is 0 or 1, and g' is 1. In some embodiments, f is 0. In some embodiments, $R^{3b}$ is alkylene having 1 to 18, 1 to 12, 1 to 8, 1 to 6, or 2 to 6 carbon atoms and is uninterrupted or interrupted with at least one catenated —O— or —N($R^{11}$)— or combination thereof. In some embodiments, $R^{3b}$ is alkylene having 2 to 6 carbon atoms.

In some embodiments, the silane in the composition can be partially hydrolyzed and condensed. Such compounds may be represented by formula XXVII.

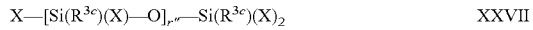

$$X-[Si(R^{3c})(X)-O]_{r''}-Si(R^{3c})(X)_2 \quad \text{XXVII}$$

In formula XXVII, r" is 1 to 20, X is as defined above in any of its embodiments in connection with formula XXV, and each $R^{3'}$ is independently monovalent alkyl, aryl, arylalkylenyl, wherein alkyl and arylalkylenyl are each uninterrupted or interrupted with at least one catenated —O—, —N($R^{11}$)—, —S—, —P—, —Si— or combination thereof, wherein aryl and arylalkylenyl are each unsubstituted or substituted by alkyl or alkoxy, and wherein alkyl, aryl, and arylalkylenyl are each unsubstituted or substituted with at least one epoxy, thiol, (meth)acrylate, vinyl, allyl, isocyanate, thiocyanate, ureido, chloro, or a combination thereof. $R^{11}$ is hydrogen, alkyl, aryl, or arylalkylenyl, wherein aryl and arylalkylenyl are unsubstituted or substituted by at least one alkyl, alkoxy, or combination thereof. In some embodiments, $R^{11}$ is hydrogen or alkyl, for example, having 1 to 4 carbon atoms (e.g., methyl, ethyl, n-propyl, isopropyl, n-butyl, isobutyl, or sec-butyl). In some embodiments, $R^{11}$ is methyl or hydrogen. In some embodiments, each $R^{3c}$ is independently alkylene having 1 to 18, 1 to 12, 1 to 6, or 2 to 6 carbon atoms and is uninterrupted or interrupted with at least one catenated —O— or —N(H)— or combination thereof. In some embodiments, each $R^{3c}$ is independently alkylene having 2 to 6 carbon atoms.

In some embodiments, the composition of the present disclosure includes at least 0.01 wt. %, at least 0.1 wt. %, or at least 1 wt. % of the at least one additional silane having hydrolyzable functionality, including any of those described above, based on the total weight of the composition. In some embodiments, the composition includes up to 30 wt. %, up to 25 wt. %, or up to 15 wt. % of at least one additional silane having hydrolyzable functionality, including any of those described above, based on the total weight of the composition. In embodiments that include solvent and/or water, any of these percentages can be based on the total weight of the solids in the composition (i.e., excluding solvent and/or water).

In some embodiments of the composition of the present disclosure, the coating composition includes a solvent (e.g., an organic solvent). Suitable organic solvents can be selected to provide a composition that has good spreading characteristics, that can be easily applied to a surface, that does not evaporate too quickly or too slowly, and that permits excess composition to be removed without creating streaks that impair the appearance of the finished, coated surface, that solubilize other components of the composition but does not solubilize components of the underlying coatings (e.g., paint, plastic, glass). Combinations of organic solvents may be used to impart desired properties to the composition.

In some embodiments of the composition of the present disclosure, the coating composition includes a cyclosiloxane solvent or other methylated siloxane solvent. Examples of useful siloxane solvents include hexamethyldisiloxane, octamethyltrisiloxane, decamethyltetrasiloxane, dodecamethylpentasiloxane, tetradecamethylhexasiloxane, hexadecamethylheptasiloxane, methyltris(trimethylsiloxy)silane, octamethylcyclotetrasiloxane, decamethylcyclopentasiloxane, and dodecamethylcyclohexasiloxane. In some embodiments, the composition of the present disclosure includes a cyclosiloxane solvent (such as those commercially available under the trade name "PMX" from Dow Chemical Co., Midland, Mich., or Univar, Downers Grove, Ill., such as PMX-245 (cyclopentasiloxane) and PMX-246 (cyclohexasiloxane)

Suitable solvents for use in the composition of the present disclosure include aprotic solvents such as isoparaffins (e.g., oil-like, fully-saturated, linear and/or branched aliphatic hydrocarbons having around 9 to 13 carbon atoms, such as those commercially available under the trade name "ISOPAR" from ExxonMobil Chemical Co., Houston, Tex., especially ISOPAR L, ISOPAR H, ISOPAR K, ISOPAR M, and ISOPAR N); aromatic fluids (e.g., those produced from petroleum-based raw materials and have an aromatic content of 99% or greater and are composed primarily of $C_9$-$C_{10}$ dialkyl and trialkylbenzenes, such as those commercially available under the trade name "SOLVESSO" from Brenntag Solvents, Warington, UK, especially Aromatic 100 and Aromatic 200); dearomatized fluids (e.g., aliphatic solvents that include a low amount of aromatic hydrocarbon solvents, in which the major components include normal alkanes, isoalkanes, and cyclics, such as those commercially available under the trade name "EXXSOL" from ExxonMobil Chemical Co., Houston, Tex., especially EXXSOL D40, EXXSOL D130, EXXSOL D95, and EXXSOL Methylpentane Naphtha, as well as under the trade name "DRAKESOL" from Calumet Specialty Products Partners, LP, Indianapolis, Ind., especially DRAKESOL 205); non-dearomatized fluids (e.g., petroleum hydrocarbon distillates, such as those commercially available under the trade name "VARSOL" from ExxonMobil Chemical Co., Houston, Tex., especially VARSOL 1, VARSOL 18, VARSOL 60, and VARSOL 110); paraffins (e.g., refined petroleum solvents including predominantly C7-C11 hydrocarbons, typically 55% paraffins, 30% monocycloparaffins, 2% dicycloparaffins, and 12% alkylbenzenes, such as VM&P Naptha commercially available from Sunnyside Corp., Wheeling, Ill., Startex Chemicals, Woodlands, Tex., or Spectrum Chemical, New Brunswick, N.J.); glycol ethers or esters (e.g., solvents based on alkyl ethers and diethers of ethylene glycol or propylene glycol, such as those commercially available under the trade names "DOWANOL" and "PROGLYDE" from Dow Chemical Co., Midland, Mich., or Lyondell Basell, Houston, Tex., especially DOWANOL Eph (ethylene glycol phenyl ether), DOWANOL PGDA (propylene glycol diacetate), DOWANOL DPM (di(propylene glycol) methyl ether), DOWANOL DPMA (di(propylene glycol) methyl ether acetate), DOWANOL LoV 485 Coalescent glycol ether, and PROGLYDE DMM (dipropylene glycol dimethyl ether), as well as the ester Butyl Carbitol Acetate (diethylene glycol n-butyl ether acetate)); esters (e.g., isoamyl acetate (3-methylbutyl acetate) and ethyl benzoate); ketones (e.g., diisobutylketone, isobutylheptylketone, and isophorone (an α,β-unsaturated cyclic ketone)); amides (e.g., dimethylformamide); cyclosiloxanes (such as those commercially available under the trade name "PMX" from Dow Chemical Co., Midland, Mich., or Univar, Downers Grove, Ill., such as PMX-245 (cyclopentasiloxane) and PMX-246 (cyclohexasiloxane); and monoterpenes (e.g., d-limonene and pinene).

In some embodiments, the organic solvent is a non-halogenated organic solvent having a boiling point of at least 160° C. Non-halogenated organic solvents include organic solvents that do not include halogen atoms (e.g., chlorine, bromine), such as halogenated solvents like 1,2-dichlorobenzene.

In some embodiments, the composition of the present disclosure has a volatile organic content (VOC) of no more than 750 grams per liter (g/L) (or no more than 500 g/L, or no more than 250 g/L). In this context, the terms "volatile organic content" and "VOC" refer to the volatility of the composition as measured by ASTM D6886-18 (Standard Test Method for Determination of the Weight Percent Individual Volatile Organic Compounds in Waterborne Air-Dry Coatings by Gas Chromatography). This test uses methyl palmitate as a reference marker. A compound that elutes prior to the marker is considered VOC while a compound that elutes after the marker is not considered VOC. A "non-VOC" compound refers to a compound that elutes after the methyl palmitate marker.

The amount of solvent, if present, should be sufficient to prevent the composition from evaporating too quickly during application, which may cause the composition to have a streaky appearance or otherwise make it difficult to wipe off any excess composition. Too much solvent may evaporate too slowly or making the composition difficult to apply. In some embodiments of the composition of the present disclosure, the composition includes at least 1 wt. %, at least 5 wt. %, or at least 10 wt. % of at least one organic solvent and/or siloxane solvent, based on the total weight of the composition. In some embodiments, the composition includes up to 99 wt. %, up to 95 wt. %, or up to 90 wt. % of at least one organic solvent and/or siloxane solvent, based on the total weight of the composition. In some embodiments, the composition includes not more than 25 wt. %, 20 wt. %, 15 wt. %, 10 wt. %, 5 wt. %, 4 wt. %, or 1 wt. %, organic solvent and/or siloxane solvent, based on the total weight of the composition. The organic and siloxane solvents can be any of those described above in any of their embodiments.

The composition of the present disclosure can include other components to impart particular desired properties. The composition can include conventional additives such as initiators, emulsifiers (including surfactants), stabilizers, anti-oxidants, flame retardants, adhesion promoters (for example, alkoxysilanes), release modifiers (for example, silicate resins including silicate MQ resin), colorants, thickeners (for example, carboxy methyl cellulose (CMC), polyvinylacrylamide, polypropylene oxide, polyethylene oxide/polypropylene oxide copolymers, polyalkenols), and combinations thereof. In some embodiments, the composition is substantially free of surfactant (that is, it has less than 1, 0.5, 0.1, or 0.05% by weight surfactant, based on the total weight of the composition.)

In some embodiments, compositions according to the present disclosure comprise water. In some embodiments, the water is present in the composition in a range from 0.01 percent to 5 percent (in some embodiments, 0.05 to 1, 0.05 to 0.5, or 0.1 to 0.5 percent) by weight, based on the total weight of the composition. Water may be added to the composition or may be added as part of an aqueous acidic solution (e.g., concentrated hydrochloric acid is 37% by weight of the acid in water). However, we have found that it is typically not necessary to add water to the compositions described herein. The water useful for hydrolysis of the silane groups may be adventitious water in the solvent or adsorbed to the surface of the substrate or may be present in the atmosphere to which the amino-functional compound and the polyorganosiloxane are exposed (e.g., an atmosphere having a relative humidity of at least 10%, 20%, 30%, 40%, or even at least 50%). The low amount of water can be beneficial to the shelf-stability of some embodiments of the composition of the present disclosure.

In some embodiments, the composition of the present disclosure can be an emulsion (e.g., an oil-in-water emulsion). In these embodiments, the composition can include up to 99 wt. %, up to 95 wt. %, or up to 90 wt. % water, based on the total weight of the composition. In some of these embodiments, the composition includes at least 50 wt. %, at least 60 wt. %, or at least 75 wt. % water, based on the total weight of the composition. Purified or deionized water may be useful.

Emulsions typically include an emulsifier. A wide variety of surfactants can be useful as emulsifiers. In some embodiments, the emulsifier includes at least one of a nonionic surfactant or an anionic surfactant. In some embodiments, the emulsifier includes a nonionic surfactant and optionally an anionic surfactant. Suitable nonionic surfactants include polyoxyethylene (POE) and polyoxypropylene (POP) aliphatic ethers having a linear or branched chain with 12 to 20 carbon atoms. The surfactant may include both POE and POP units in a random or block form. The surfactant may contain 1 to 100, 3 to 50, or 5 to 20 POE or POP units or a combination thereof. Suitable examples include POE (4 to 11) lauryl ether, POE (10 to 20) cetyl ether, POE (4 to 20) oleyl ether, POP (5) lauryl ether, POP (7) cetyl ether, POP (10) oleyl ether, and POE (3) POP (5) lauryl ether, wherein the numerical values in parentheses of POE and POP indicate the number of units of oxyethylene unit and oxypropylene unit. In some embodiments, the nonionic surfactant is an alcohol ethoxylate. Examples of suitable anionic surfactants include sulfates of polyethoxylated derivatives of straight or branched chain aliphatic alcohols and carboxylic acids. The anionic surfactant can be the sulfate of any of the polyethoxylated derivatives of straight or branched chain aliphatic alcohols described above. Suitable surfactants are available from a variety of commercial sources. In some embodiments, the surfactant comprises at least one of a five-mole ethoxylate of a linear, primary 12-14 carbon number alcohol available, for example, from Huntsman Corporation, The Woodlands, Tex., under the trade designation "SURFONIC L24-5" Surfactant, an alcohol ethoxylate available, for example, from Dow Chemical Company under the trade designation "ECOSURF EH-6", and a sodium salt of a fatty alcohol polyglycol ether sulphate, available, for example, from BASF Corporation, Florham Park, N.J., under the trade designation "DISPONIL FES 32IS".

In some embodiments, the emulsion composition can include up to 10 wt. % or up to 8 wt. % of a surfactant, including any of those described above, based on the total weight of the emulsion. In some embodiments, the emulsion composition includes at least 0.50 wt. % or at least 1 wt. % of a surfactant, including any of those described above, based on the total weight of the emulsion. In some embodiments, the emulsion composition can include up to 10 wt. % or up to 8 wt. % of reactive ingredients, including the first polyorganosiloxane, the amino-functional silane, the silane having at least one hydrolyzable group, and the catalyst as described above in any of their embodiments, based on the total weight of the emulsion. In some embodiments, the emulsion composition includes at least 1 wt. %, at least 3 wt. %, or about 5 wt. % of these reactive ingredients as described above in any of their embodiments, based on the total weight of the emulsion.

The composition of the present disclosure can be free of fluorinated silanes, for example, having a structure represented by formula RF-Q-Si$(Y)_p(R)_{3-p}$ or $(Y)_p(R)_{3-p}$Si-Q-RF-Q-Si$(Y)_p(R)_{3-p}$, wherein RF is a monovalent or divalent fluoroalkyl group or a perfluoropolyether group, and Q, Y, R, and p are as defined above in any of their embodiments. In some embodiments, the composition is substantially free of these fluorinated silanes (that is, it has less than 1, 0.5, 0.1, or 0.05% by weight fluorinated silane, based on the total weight of the composition.

The composition of the present disclosure can be prepared by combining the various components, in some embodiments, with agitation or stirring. The composition can be maintained as a relatively shelf-stable, two-part system (for example, by keeping the catalyst separate from the polyorganosiloxane and other silane compounds), if desired, but a one-part system (comprising the catalyst, polyorganosiloxane, amino-functional silane, cyclic azasilane, and optionally other silanes and siloxanes) can also be stable (such that there is no gelling or precipitation, for example) for periods of at least two months, and often up to one year, or five years, or even longer if packaged to exclude moisture before coating or otherwise applying the composition. When the composition is an emulsion, its shelf life can be maximized by storing it sealed at room temperature in a container with minimal headspace and avoiding exposing it to ambient air. The container can be purged with inert gas before filling. Utilization of a ventless sprayer to apply the composition may also be useful.

A variety of methods may be useful for applying the composition. Typically, and advantageously, a small amount of coating composition can be applied to the surface to be treated. For example, approximately 6 drops/ft$^2$ (65 drops/m$^2$) may be used, depending on the condition of the surface being treated (weathered or deteriorated surfaces may benefit from using a larger amount of the coating composition). The composition may be applied to a surface either directly using a variety of techniques (e.g., spraying), or the composition may be first applied to a spreading device (e.g., a cloth) and then applied to a surface. In one convenient approach, the coating compositions may be evenly distributed on a surface by hand-wiping with a clean, dry cloth or pad (e.g., a suede or microfiber cloth, a foam pad, or a combination thereof) using, for example, overlapping circular strokes.

In some embodiments of the method of making a coated article of the present disclosure, the method comprises allowing or inducing the coating composition to at least partially cure. In some embodiments, at least 0.1 minute, at least 1 minute, from two to five minutes, or no more than 30 minutes after the composition is applied, excess composition may be wiped off and the coating allowed to further cure. In some embodiments, at least 0.1 minute, at least 1 minute, from two to five minutes, or no more than 30 minutes after the composition is applied, excess composition may be wiped off, and the composition can be applied again. In some embodiments, the composition is allowed or induced to cure for 30 seconds to 30 minutes before the excess is wiped off. In some embodiments, cure conditions of 70° F.±5° F. (21.1° C.±2.8° C.) and 50%±3% relative humidity are used. Shorter or longer curing times may be used if desired by the user. The composition may then be allowed to cure for up to 10 days, 7 days, 3 days, 5 days, one day, or one hour at 70° F.±5° F. (21.1° C.±2.8° C.) and 50%±3% relative humidity. In some embodiments, multiple coats are applied, allowing a three-day cure for each coat.

In some embodiments of the articles of the present disclosure and/or made by the method of the present disclosure, the composition provides a clear, streak-free, and in some cases, a glass-like, finish on the coated surface.

In some embodiments of the articles of the present disclosure and/or made by the method of the present disclosure, the composition provides excellent water-beading on substrate surfaces, encouraging a large number of well-rounded, hemispherical water drops to form or "bead up." Advantageously, these drops often easily roll off the car, carrying and dirt or debris with them. Thus, compositions described herein may promote faster drying and a self-cleaning property of a surface that subsequently becomes wet.

In some embodiments of the articles of the present disclosure and/or made by the method of the present disclosure, the composition facilitates the release of water from surfaces. Water applied to such a surface (for example, from precipitation or rinse water used to wash and clean a substrate surface) will be readily released from or "run off" the surface, thereby reducing the water marks or water spots that may have to be removed once any water that remains on the coated surface evaporates.

Desirably, the composition typically provides sufficient durability to maintain acceptable performance and a desired appearance even after the coated surface has been subjected to repeated washing and rinsing cycles. For example, a motor vehicle panel that has been treated according to some embodiments of the present disclosure may still promote excellent water-beading, encouraging a large number of small, well-rounded, hemispherical water drops to form or "bead up" even after more than 100 back-and-forth wiping motions (cycles) with a soft foam pad that has been saturated with a 9% aqueous automotive shampoo solution, or more than 200 cycles, or more than 250 cycles.

In some embodiments, an article is prepared as described herein using the Test Panel Coating Method in the Examples Section, wherein a first coating composition is applied twice and each time allowed to cure for 45 seconds before the excess coating solution is removed, with 60 minutes between coats, and the second application allowed to further cure for 30 minutes before application of the second coating composition. In the Panel Coating Method, the second coating composition is allowed to cure or dry for 30 minutes before excess solution is removed and then allowed to further cure or dry for 72 hours in a controlled temperature and humidity room set at 72° F. and 50% relative humidity. In some embodiments, the articles prepared in this manner display at least one of the following properties: a Coefficient of Friction of less than 0.1 measured according to the Coefficient of Friction Test Method in the Examples Section; a Coefficient of Friction of less than 0.15 after 500 scrubs (made according to the Panel Scrub Test Method in the Examples Section; a receding contact angle of greater than 90 degrees measured according to the Water Contact Angle Test Method of the Examples Section; a receding contact angle of greater than 80 degrees after 500 scrubs (made according to the Panel Scrub Test Method in the Examples Section) measured according to the Water Contact Angle Test Method in the Examples Section; and a receding contact angle of at least 70 degrees after being submerged in 90° C. water for two hours (made according to the Hot Water Test Method in the Examples Section) measured according to the Water Contact Angle Test Method in the Examples Section.

In some embodiments, the substrate of the article of the present disclosure and/or made by the method disclosed herein includes glass, plastic, rubber, wood, gel-coat, leather, fiberglass, fabric, metal, a painted surface, a polymeric film, or a combination thereof. In some embodiments, the substrate is transparent. Plastics useful as a substrate include polyethylene terephthalate (PET), high density polyethylene (HDPE), polyvinyl chloride (PVC), low density polyethylene (LDPE), polypropylene (PP), polystyrene (PS), polycarbonate, and mixtures thereof. Carbon and graphite fibers and other materials can be useful as reinforcing agents in plastic composites. Both ferrous and nonferrous metal surfaces useful as a substrate in the method and article of the present disclosure. Examples of useful metals include aluminum, brass, bronze, chrome, copper, tin, zinc, iron, stainless steel and steel. Painted metal substrates and bare metal substrates may be useful substrates, depending on the desired application. Polymeric films useful as substrates in the article and method of the present disclosure include car wrap films. Examples of useful polymeric films include polyurethane films and vinyl (PVC) films.

In addition, while the various embodiments have particular utility for motor vehicles, other applications are contemplated such as use on surfaces associated with marine and aerospace environments, household uses (e.g., tub and shower enclosures), and for building maintenance (e.g., windows).

Some Embodiments of the Disclosure

In a first embodiment, the present disclosure provides a composition comprising:

a first polyorganosiloxane comprising divalent units represented by formula:

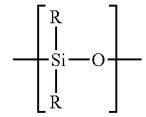

and greater than two $-Si(Y)_p(R)_{3-p}$ groups, wherein each R is independently alkyl, aryl, arylalkylenyl, or heterocycloalkylenyl, wherein alkyl and arylalkylenyl are unsubstituted or substituted with halogen and optionally interrupted by at least one catenated $-O-$, $-S-$, $-N(R^{11})-$, or combination thereof, wherein aryl, arylalkylenyl, and heterocycloalkylenyl are unsubstituted or substituted by at least one alkyl, alkoxy, halogen, or combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof;

each Y is independently a hydrolysable group; and p is 1, 2, or 3; and at least one of an amino-functional silane represented by formula $(R^6)_2N-[R^4-Z]_r-R^4-[Si(Y)_p(R^5)_{3-p}]$ or a cyclic azasilane represented by formula

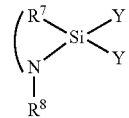

wherein each $R^4$ is independently alkylene, arylene, or alkylene optionally interrupted or terminated by arylene;

$R^5$ is alkyl, aryl, arylalkylenyl, or heterocycloalkylenyl, wherein aryl and arylalkylenyl are unsubstituted or substituted by at least one alkyl, alkoxy, or combination thereof;

each Z is independently $-O-$ or $-N(R^6)-$;

each $R^6$ is independently hydrogen, alkyl, aryl, arylalkylenyl, or $-R^4-[Si(Y)_p(R^5)_{3-p}]$, wherein aryl and arylalkylenyl are unsubstituted or substituted by at least one alkyl, alkoxy, or combination thereof;

$R^7$ is an alkylene having 2 to 5 carbon atoms and is uninterrupted or interrupted by at least one catenated $-N(R^8)-$;

each $R^8$ is independently hydrogen, alkyl, or alkenyl, wherein alkyl and alkenyl are unsubstituted or substituted by $-NR'R^2$, wherein $R^1$ and $R^2$ are independently hydrogen or alkyl;

each Y is independently a hydrolyzable group;

r is 0, 1, 2, or 3; and p is 1, 2, or 3.

In a second embodiment, the present disclosure provides the composition of the first embodiment, wherein the first polyorganosiloxane comprises at least one of at least three —Si(Y)$_p$(R)$_{3-p}$ groups or up to six —Si(Y)$_p$(R)$_{3-p}$ groups and/or wherein the ratio of divalent units represented by formula:

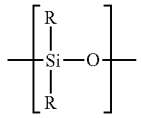

to —Si(Y)$_p$(R)$_{3-p}$ groups is at least 4.

In a third embodiment, the present disclosure provides the composition of the first or second embodiment, wherein the first polyorganosiloxane comprises (m) terminal units represented by formula -Q-Si(Y)$_p$(R)$_{3-p}$ and (n) divalent units represented by formula:

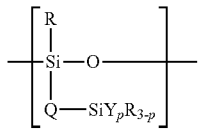

wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N(R$^{11}$)—, or combination thereof, wherein aryl, arylalkylenyl, and heterocycloalkyenyl are unsubstituted or substituted by at least one alkyl, alkoxy, halogen, or combination thereof, and wherein R$^{11}$ is hydrogen, alkyl, aryl, or arylalkylenyl, wherein aryl and arylalkylenyl are unsubstituted or substituted by at least one alkyl, alkoxy, or combination thereof;

each Q is independently a bond, alkylene, arylene, or alkylene that is at least one of interrupted or terminated by aryl, wherein the alkylene, arylene, and alkylene that is at least one of interrupted or terminated by aryl are optionally at least one of interrupted or terminated by at least one ether, thioether, amine, amide, ester, thioester, carbonate, thiocarbonate, carbamate, thiocarbamate, urea, thiourea, or a combination thereof; each Y is independently a hydrolysable group;

p is 1, 2, or 3;

(n) is at least 1; and (m)+(n) is greater than 2.

In a fourth embodiment, the present disclosure provides the composition of the third embodiment, wherein (m)+(n) is in a range from 3 to 6.

In a fifth embodiment, the present disclosure provides the composition of any one of the first to fourth embodiments, wherein the first polyorganosiloxane further comprises at least one or two terminal —Si(R)$_3$ groups, wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N(R$^{11}$)—, or combination thereof, wherein aryl, arylalkylenyl, and heterocycloalkyenyl are unsubstituted or substituted by at least one alkyl, alkoxy, halogen, or combination thereof, and wherein R$^{11}$ is hydrogen, alkyl, aryl, or arylalkylenyl, wherein aryl and arylalkylenyl are unsubstituted or substituted by at least one alkyl, alkoxy, or combination thereof.

In a sixth embodiment, the present disclosure provides the composition of any one of the first to fifth embodiments, wherein each R is independently methyl or phenyl.

In a seventh embodiment, the present disclosure provides the composition of any one of the first to sixth embodiments, wherein the first polyorganosiloxane has not more than 10 percent by weight units represented by formula RSiO3/2, based on the total weight of the first polyorganosiloxane.

In an eighth embodiment, the present disclosure provides the composition of any one of the first to seventh embodiments, the first polyorganosiloxane is represented by formula:

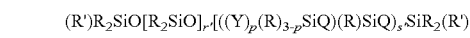

(R')R$_2$SiO[R$_2$SiO]$_{r'}$[((Y)$_p$(R)$_{3-p}$SiQ)(R)SiQ)$_{s'}$SiR$_2$(R')

wherein each R' is independently R, Y, or a terminal unit represented by formula -Q-Si(Y)$_p$(R)$_{3-p}$;

each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N(R$^{11}$)—, or combination thereof, wherein aryl, arylalkylenyl, and heterocycloalkyenyl are unsubstituted or substituted by at least one alkyl, alkoxy, halogen, or combination thereof, and wherein R$^{11}$ is hydrogen, alkyl, aryl, or arylalkylenyl, wherein aryl and arylalkylenyl are unsubstituted or substituted by at least one alkyl, alkoxy, or combination thereof;

each Q is independently a bond, alkylene, arylene, or alkylene that is at least one of interrupted or terminated by aryl, wherein the alkylene, arylene, and alkylene that is at least one of interrupted or terminated by aryl are optionally at least one of interrupted or terminated by at least one ether, thioether, amine, amide, ester, thioester, carbonate, thiocarbonate, carbamate, thiocarbamate, urea, thiourea, or a combination thereof;

r'+s' is in a range from 10 to 500, wherein s' is at least 1; and each Y is independently a hydrolyzable group; and each p is 1, 2, or 3, with the proviso that there are greater than two -Q-Si(Y)$_p$(R)$_{3-p}$ groups in the first polyorganosiloxane.

In a ninth embodiment, the present disclosure provides the composition of any one of the first to eighth embodiments, wherein the first polyorganosiloxane is a linear polyorganosiloxane.

In a tenth embodiment, the present disclosure provides the composition of any one of the first to ninth embodiments, wherein the first polyorganosiloxane has a molecular weight of at least 300 grams per mole.

In an eleventh embodiment, the present disclosure provides the composition of any one of the first to tenth embodiments, wherein each Y is independently alkoxy, aryloxy, or acyloxy.

In a twelfth embodiment, the present disclosure provides the composition of any one of the first to eleventh embodiments, wherein each Y is methoxy, and wherein the polyorganosiloxane has a weight percent of methoxy groups of not more than 20 weight percent, based on the total weight of the polyorganosiloxane.

In a thirteenth embodiment, the present disclosure provides the composition of any one of the first to twelfth embodiments, wherein the composition comprises the amino-functional silane represented by formula (R$^6$)$_2$N—[R$^4$—Z]$_r$—R$^4$—[Si(Y)$_p$(R$^5$)$_{3-p}$], wherein each Y is independently alkoxy, aryloxy, or acyloxy.

In a fourteenth embodiment, the present disclosure provides the composition of the thirteenth embodiment, wherein the amino-functional silane is 3-aminopropyltrimethoxysilane, 3-aminopropyltriethoxysilane, bis(3-trimethoxysilylpropyl)amine, bis(3-triethoxysilylpropyl) amine, N-methyl-bis(3-trimethoxysilylpropyl)amine, N-methyl-bis(3-triethoxysilylpropyl)amine, [3-(2-aminoethylamino)propyl]trimethoxysilane, 3-[2-(2-aminoethylamino)ethylamino]propyltrimethoxysilane, [3-(2-aminoethylamino)propyl]triethoxysilane, 3-[2-(2-aminoethylamino) ethylamino]propyltriethoxysilane, N,N'-bis[3-trimethoxysilylpropyl]-ethylenediamine, N,N-bis[3-trimethoxysilylpropyl]-ethylenediamine, or a combination thereof.

In a fifteenth embodiment, the present disclosure provides the composition of any one of the first to fourteenth embodiments, wherein the composition comprises the cyclic azasilane represented by formula

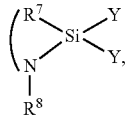

wherein each Y is independently alkoxy, aryloxy, or acyloxy.

In a sixteenth embodiment, the present disclosure provides the composition of the fifteenth embodiment, wherein the cyclic azasilane is 2,2-dimethoxy-N-butyl-1-aza-2-silacyclopentane, 2-methyl-2-methoxy-N-(2-aminoethyl)-1-aza-2-silacyclopentane, 2,2-diethoxy-N-(2-aminoethyl)-1-aza-2-silacyclopentane, 2,2-dimethyl-N-allyl-1-aza-2-silacyclopentane, 2,2-dimethoxy-N-methyl-1-aza-2-silacyclopentane, 2,2-diethoxy-1-aza-2-silacyclopentane, 2,2-dimethoxy-1,6-diaza-2-silacyclooctane, N-methyl-1-aza-2,2,4-trimethylsilacyclopentane, or a combination thereof.

In a seventeenth embodiment, the present disclosure provides the composition of any one of the first to sixteenth embodiments, further comprising a catalyst for at least one of hydrolyzing the Y groups in at least one of the polyorganosiloxane, amino-functional silane, or cyclic azasilane or condensing silanol groups to form siloxane bonds.

In an eighteenth embodiment, the present disclosure provides the composition of the seventeenth embodiment, wherein the catalyst comprises at least one of an organic tin compound, organic titanium compound, organic zirconium compound, organic aluminum compound, an inorganic base, or nitrogen-containing organic base.

In a nineteenth embodiment, the present disclosure provides the composition of any one of the first to eighteenth embodiments, further comprising a second polyorganosiloxane comprising divalent units represented by formula:

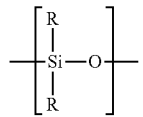

wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N(R$^{11}$)—, or combination thereof, wherein aryl, arylalkylenyl, and heterocycloalkyenyl are unsubstituted or substituted by at least one alkyl, alkoxy, halogen, or combination thereof, and wherein R$^{11}$ is hydrogen, alkyl, aryl, or arylalkylenyl, wherein aryl and arylalkylenyl are unsubstituted or substituted by at least one alkyl, alkoxy, or combination thereof, and wherein the second polyorganosiloxane does not include hydrolyzable groups.

In a twentieth embodiment, the present disclosure provides the composition of the nineteenth embodiment, wherein the second polyorganosiloxane is a polydimethylsiloxane.

In a twenty-first embodiment, the present disclosure provides the composition of any one of the first to twentieth embodiments, further comprising a third polyorganosiloxane comprising divalent units represented by formula:

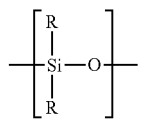

and at least one —Si(Y)$_p$(R)$_{3-p}$ group, wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N(R$^{11}$)—, or combination thereof, wherein aryl, arylalkylenyl, and heterocycloalkyenyl are unsubstituted or substituted by at least one alkyl, alkoxy, halogen, or combination thereof, and wherein R$^{11}$ is hydrogen, alkyl, aryl, or arylalkylenyl, wherein aryl and arylalkylenyl are unsubstituted or substituted by at least one alkyl, alkoxy, or combination thereof;

each Y is independently a hydrolyzable group; and p is 1, 2, or 3.

In a twenty-second embodiment, the present disclosure provides the composition of the twenty-first embodiment, wherein the third polyorganosiloxane comprises two -Q-Si(Y)$_p$(R)$_{3-p}$ terminal groups, wherein each Q is independently a bond, alkylene, arylene, or alkylene that is at least one of interrupted or terminated by aryl, wherein the alkylene, arylene, and alkylene that is at least one of interrupted or terminated by aryl are optionally at least one of interrupted or terminated by at least one ether, thioether, amine, amide, ester, thioester, carbonate, thiocarbonate, carbamate, thiocarbamate, urea, thiourea, or a combination thereof, each Y is independently alkoxy, aryloxy, or acyloxy; and each p is 1, 2, or 3.

In a twenty-third embodiment, the present disclosure provides the composition of any one of the first to twenty-second embodiments, wherein the first coating composition further comprises a silane having at least one hydrolyzable group.

In a twenty-fourth embodiment, the present disclosure provides the composition of the twenty-first embodiment, wherein the silane is represented by formula:

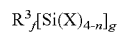

wherein:

g is 1 to 6;

f is 0, 1 or 2, with the proviso that when f is 0, g is 1;

each R$^3$ is monovalent or multivalent, and is independently alkyl, aryl, or arylalkylenyl, wherein alkyl and arylalkylenyl are each uninterrupted or interrupted with at least one catenated —O—, —N($R^{11}$)—, —S—, —P—, —Si— or combination thereof, wherein aryl and arylalkylenyl are each unsubstituted or substituted by alkyl or alkoxy, and wherein alkyl, aryl, and arylalkylenyl are each unsubstituted or substituted with at least one epoxy, thiol, (meth)acrylate, vinyl, allyl, isocyanate, thiocyanate, ureido, chloro, or a combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof; and each X is independently hydroxyl or a hydrolyzable group.

In a twenty-fifth embodiment, the present disclosure provides the composition of the twenty-fourth embodiment, wherein m is 1 or 2.

In a twenty-sixth embodiment, the present disclosure provides the composition of the twenty-fourth or twenty-fifth embodiment, wherein n is 1.

In a twenty-seventh embodiment, the present disclosure provides the composition of any one of the twenty-fourth to twenty-sixth embodiments, wherein each $R^3$ is substituted with at least one epoxy, thiol, (meth)acrylate, vinyl, allyl, isocyanate, thiocyanate, ureido, chloro, or a combination thereof.

In a twenty-eighth embodiment, the present disclosure provides the composition of any one of the twenty-fourth to twenty-seventh embodiments, wherein each X is hydroxyl or ($C_1$-$C_4$)alkoxy.

In a twenty-ninth embodiment, the present disclosure provides the composition of any one of the twenty-fourth to twenty-eighth embodiments, wherein each $R^3$ is alkyl.

In a thirtieth embodiment, the present disclosure provides the composition of any one of the twenty-fourth to twenty-ninth embodiments, wherein the silane comprises at least one of methacryloxypropyltrimethoxysilane, 3-glycidoxypropyltrimethoxysilane, isooctyltrimethoxysilane, 3-mercaptopropyltrimethoxysilane, isobutyltrimethoxysilane, or tetraethyl orthosilicate.

In a thirty-first embodiment, the present disclosure provides the composition of the twenty-third embodiment, wherein the silane is represented by formula:

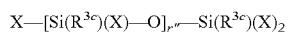

wherein:

r" is 1 to 20;

each $R^{3c}$ is independently monovalent alkyl, aryl, or arylalkylenyl, wherein alkyl and arylalkylenyl are each uninterrupted or interrupted with at least one catenated —O—, —N($R^{11}$)—, —S—, —P—, —Si— or combination thereof, wherein aryl and arylalkylenyl are each unsubstituted or substituted by alkyl or alkoxy, and wherein alkyl, aryl, and arylalkylenyl are each unsubstituted or substituted with at least one amino, epoxy, thiol, (meth)acrylate, vinyl, allyl, isocyanate, thiocyanate, ureido, chloro, or a combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof; and each X is independently hydroxyl or a hydrolysable group.

In a thirty-second embodiment, the present disclosure provides the composition of any one of the first to thirty-first embodiments, wherein the composition is essentially free of fluorinated silanes.

In a thirty-third embodiment, the present disclosure provides the composition of any one of the first to thirty-second embodiments, further comprising at least one non-halogenated organic solvent having a boiling point of at least 160° C.

In a thirty-fourth embodiment, the present disclosure provides the composition of any one of the first to thirty-second embodiments, wherein the composition comprises not more than 20 weight percent organic solvent, based on the total weight of the composition.

In a thirty-fifth embodiment, the present disclosure provides the composition of any one of the first to thirty-fourth embodiments, wherein the composition comprises not more than five percent by weight water, based on the total weight of the composition.

In a thirty-sixth embodiment, the present disclosure provides the composition of any one of the first to thirty-fourth embodiments, further comprising water and at least one of a nonionic surfactant or an anionic surfactant.

In a thirty-seventh embodiment, the present disclosure provides the composition of the thirty-sixth embodiment, wherein the composition is an oil-in-water emulsion.

In a thirty-eighth embodiment, the present disclosure provides a method of making a coated article, the method comprising:

applying the composition of any one of the first to thirty-seventh embodiments on at least a portion of a surface of a substrate; and allowing or inducing the composition to at least partially cure to form a coating on at least a portion of the surface of the substrate.

In a thirty-ninth embodiment, the present disclosure provides the method of the thirty-eighth embodiment, further comprising removing a portion of the composition from the surface of the substrate before allowing or inducing the composition to fully cure.

In a fortieth embodiment, the present disclosure provides the method of the thirty-eighth or thirty-ninth embodiment, wherein allowing or inducing the first coating composition to at least partially cure is carried out at room temperature.

In a forty-first embodiment, the present disclosure provides the method of any one of the thirty-eighth to fortieth embodiments, wherein the substrate is at least a portion of a vehicle.

In a forty-second embodiment, the present disclosure provides the method of any one of the thirty-eighth to forty-first embodiments, wherein the surface of the substrate comprises at least one of glass, plastic, metal, paint, rubber, wood, gel-coat, leather, fiberglass, fabric, or a polymeric film.

In a forty-third embodiment, the present disclosure provides a coated article made by the method of any one of the thirty-eighth to forty-second embodiments.

In a forty-fourth embodiment, the present disclosure provides the coated article of the forty-third embodiment, having a receding contact angle of greater than 80 after 500 scrubs (made according to the Panel Scrub Test Method in the Examples Section).

In a forty-fifth embodiment, the present disclosure provides the coated article of the forty-third or forty-fourth embodiment, having a Coefficient of Friction of less than 0.15 after 500 scrubs measured according to the Coefficient of Friction Test Method in the Examples Section.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims. Unless otherwise stated, all amounts are in weight percent (wt. %).

TABLE 1

Materials List.

| Abbreviation or Trade Name | Description |
|---|---|
| TMS C50 | Silmer TMS C50 is a 100% active trialkoxy functional cross-linking silicone, with the formula $(CH_3)_3SiO-[Si(CH_3)\{CH_2-CH_2-Si(OCH_3)_3\}-O]_{3.1}-[Si(CH_3)_2-O]_{145.1}-Si(CH_3)_3$, as determined from NMR spectroscopy, available from Siltech Corp., Toronto, Ontario, Canada. |
| TMS Di 50 | Silmer TMS Di-50 is a 100% active linear trialkoxy functional cross-linking silicone with the formula $(CH_3O)_3Si-CH_2-CH_2-Si(CH_3)_2-O-[Si(CH_3)_2-O]_{48.1}-Si(CH_3)_2-CH_2-CH_2-Si(OCH_3)_3$, as determined from NMR spectroscopy, available from Siltech Corp. |
| OFS-2306 | Isobutyltrimethoxysilane from Dow Corning, Midland, Michigan. |
| PDMS-50 cst | Polydimethylsiloxane fluid available under the trade designation "Xiameter PMX-200 silicone fluid 50 cst" from Dow Chemical Company, Midland, Michigan. |
| Kkat | A zinc-based silane condensation catalyst from King Industries Norwalk, Connecticut, under the trade designation "Kkat 670". |
| APTMS | 3-Aminopropyltrimethoxy silane, available under the trade designation "A-1110" from Momentive Performance Materials, Waterford, N.Y. |
| APTES | "Silquest A-1100", Gamma-aminopropyltriethoxysilane from Momentive Performance Materials. |
| BSA | Bis[3-(trimethoxysilyl)propyl]amine available from TCI America, Portland, Oregon. |
| S-15 | Silanol terminated polydimethylsiloxane available as DMS-S15, From Gelest, Morrisville, Pennsylvania. |
| MTS | Methyltrimethoxysilane from Alfa Aesar, Tewksbury, Massachusetts. |
| DHA | Di-n-hexylamine, $HN(C_6H_{13})_2$ from Alfa Aesar. |
| EHA | 2-ethylhexanoic acid from Alfa Aesar. |
| $CDCl_3$ | Deuterated chloroform available from Cambridge Isotope Laboratories, Andover, Massachusetts. |
| $Cr(acac)_3$ | Chromium (III) acetylacetonate, available from Sigma-Aldrich, St. Louis, Missouri. |
| HMS-151 | Trimethylsiloxy terminated methylhydrosiloxane - dimethyl siloxane copolymer, 1900-2000 molecular weight, 15-18 mol % MeHSiO, available from Gelest, Morrisville, Pennsylvania. |
| Vi-TMS | Vinyltrimethoxysilane, available from Alfa Aesar, Tewksbury, Massachusetts. |
| Pt-DVTMS | Platinum-divinyltetramethyldisiloxane complex (Karstedt catalyst), 3-3.5% Pt in vinyl terminated PDMS, 200 cSt, Available as SIP6830.3 from Gelest. |
| DYNASYLAN SIVO 214 | Aminofunctional silane composition from Evonik Corporation, Parsippany, N.J., which includes 3-aminopropyltriethoxysilane and bis [3-(triethoxysilyl)propyl] amine |
| SURFONIC L24-5 Surfactant | Nonionic surface active agent, the five-mole ethoxylate of a linear, primary 12-14 carbon number alcohol, from Huntsman Corporation, The Woodlands, Tex. |
| ECOSURF EH-6 Surfactant | A water soluble biodegradable nonionic surfactant from Dow Chemical Company, described as a specialty ethoxylate |
| DISPONIL FES 32IS | A fatty alcohol ether sulfate, sodium salt from BASF Corporation, Florham Park, N.J. |

Test Methods and Preparation Procedures
Fluid Contact Angle Test Method.

Fluid contact angles of each sample were measured using a Ramé-Hart goniometer (Ramé-Hart Instrument Co., Succasunna, N.J.). Advancing ($\theta_{adv}$) and receding ($\theta_{rec}$) angles were measured as fluid (deionized water unless otherwise specified) was supplied via a syringe into or out of sessile droplets (drop volume about 5 μL). Measurements were taken at three different spots on each coated ACT test panel surface, and the reported measurements are the averages of the six values for each sample (a leftside and right-side measurement for each drop). The probe fluid used in this test was deionized water. Contact Angle hysteresis ($\theta_{hys}$) was determined using the following equation: $\theta_{hys}=\theta_{adv}-\theta_{rec}$.
Coefficient of Friction (COF) Test Method.

In a controlled temperature humidity room (72° F., 50% RH), a coated ACT Test Panel, as described below, was secured on top of a IMASS SP2000 available from IMASS, Accord, Mass. using the appropriate panel clips included with the IMASS. A friction sled with tether available from IMASS, Part #SP-101038, was modified by wrapping a pre-cut 2.5 in (6.4 cm)×8 in (20.3 cm) TX300 cotton wipe, available from Tex Wipe, around the sled. A small slit was cut into the wipe to allow the tether to be exposed. The wipe was further secured with 233+ masking tape available from 3M Company. The modified friction sled was then attached to the IMASS SP2000 by the provided tether and the sled was placed onto the coated ACT test panel with the tape side up. The IMASS SP2000 settings were adjusted in the setup menu to the following: Sled Weight: 200 g; Initial Delay: 2 seconds; Averaging Time: 5 seconds; Units: In/Min; Testing Speed: 6 inches per minute (in/min). After the instrument was set up, samples were tested 3 times (15 seconds total) and the kinetic potential (KP) results were averaged.

Panel Scrub Method.

Panel scrub testing was performed by securing a coated ACT Test Panel, as described below, into a BYK Gardner Scrub machine available from BYK Gardner USA. The scrub machine was equipped with the sponge holder attachment that was modified with an extra 500 grams (g) of weight. Total weight of the holder was ~940 g.

Two 4.7 in (11.9 cm)×3.0 in (7.6 cm)×0.6 in (i.5 cm) sponge available under the trade designation "OCELO" from 3M company, were cut to fit within the sponge holder. Approximately 500 mL of a prediluted (10:1 ratio with water) Super Degreaser, Meguiar's D108 available from Meguiar's, Inc., was poured into the sample tray until the test panel was submerged in cleaner. The test panels were scrubbed using the scrub machine at a rate of 40 cycles/min for a total of 500 cycles. Contact angle measurements and Coefficient of Friction measurements were measured before and after scrubbing.

NMR Spectroscopy.

An Ultrashield 500 Plus FT NMR instrument from Bruker (Billerica, Mass.) was used to acquire $^1$H NMR (500 MHz) $^{13}$C NMR (125 MHz) and $^{29}$Si NMR (99.36 MHz) spectra. $^1$H and $^{13}$C samples were dissolved in $CDCl_3$. $^{29}$Si NMR was performed on samples that were dissolved in a solution of 0.04M $Cr(acac)_3$ in $CDCl_3$.

Synthesis of Polymer 1:

S-15 (50 grams (g)) and MTS (40.8 g) were added to a 250 mL round bottom flask with magnetic stirring and nitrogen flow over it, and DHA (0.06 g) and EHA (0.06 g) were added. The clear mixture was stirred and heated to 70° C. for 15 hours. Remaining volatile components of the mixture were then removed by rotary evaporation at 50° C., 30 min, 17 mbar. $^{29}$Si NMR indicated the disappearance of the $O-Si(CH_3)_2-OH$ resonance at ~-10 ppm, and the appearance of a $-O-Si CH_3 (OCH_3)_2$ resonance at -48 ppm. The formula of the polymer was determined to be $(CH_3O)_2(CH_3)Si-O-[Si(CH_3)_2-O]_{34.8}-Si(CH_3)(OCH_3)_2$, as determined from NMR spectroscopy.

Synthesis of Polymer 2

ViTMS (14.8 g) and Pt-DVTMS (0.5 g) were added to a 100 mL round bottom flask and heated to 70° C. under magnetic stirring. HMS-151 was added dropwise, and an exotherm was observed. The mixture was stirred 2 hours at 70° C. after the addition of the HMS-151, and then remaining volatile components of the mixture were then removed by rotary evaporation at 50° C., 30 min, 17 mbar. $^{29}$Si NMR indicated the disappearance of the $0-Si(CH_3)(H)-O$ resonance from -34--38 ppm, and the appearance of $-CH_2-Si(0 CH_3)_3$ resonance at -40--44 ppm. The formula of the polymer was calculated to be $(CH_3)_3Si-O-[Si(CH_3)_2-O]_{25.6}-[Si(CH_3)(CH_2CH_2Si(OCH_3)_3)-O]_{7.0}-Si(CH_3)_3$, as determined from NMR spectroscopy.

Panel Preparation:

Black painted steel panels with OEM-style pre-treatments and paint were used as substrate for the coating. These were purchased from ACT Test Panels, LLC 273 Industrial Dr., Hillsdale, Mich. 49242. The original Item Number for said panels is 59597 having dimensions of 18 inch (48 cm)×24 inch (61 cm)×1/32 inch (0.079 cm). Panels that had been used previously for fine abrasive testing were employed.

Before painting, the painted side of the panels was sanded using a Festool air driven dual action sander with 5 mm throw, 6 inch (15 cm) diameter backup pad, interface pad and a 3M™ Hookit™ Purple Clean Sanding Abrasive Disc, grit P400, available from 3M Company, St. Paul, Minn. The abraded surface was hand cleaned by wiping with a paper toweling wetted with SWX350 H2O-SO-CLEAN WATERBORNE PRE-CLEANER, available from PPG, Pittsburgh, Pa., followed by an additional cleaning pass using a clean microfiber cloth wetted with the same cleaning solvent. This two-step cleaning process was repeated. This was followed by a three-pass cleaning procedure using SX330 ACRYLICLEAN WAX AND GREASE REMOVER, available from PPG, in place of SWX350, using the previously described paper towels and cloth. A final cleaning pass was made with a DYNATRON 823 TACK CLOTH, available from the 3M Company, to remove any remaining dust and debris.

Using an ACCUSPRAY SPRAY GUN SYSTEM, from 3M Company, having a 1.4 mm tip at 20 psi gun pressure and a 3M PPS PAINT PREPARATION SYSTEM, from 3M Company, a sealer layer was first applied to the panel. The sealer was prepared by blending, in a 3M PPS paint cup, DAS3025 (sealer), DCX3030 (catalyst) and DT885 (reducer), all available from PPG, in a 3:1:1 ratio by volume. The coated sealer was allowed to flash dry for 10 minutes before applying a basecoat.

Using a SATA 5500 RP paint spray gun, available from SATA GmbH & Co. KG, Kornwestheim, Germany, with a 1.3 mm tip at 27 psi gun pressure and a 3M PPS PAINT PREPARATION SYSTEM, a basecoat layer was next applied. The basecoat was prepared by blending, in the 3M PPS paint cup, DBC9700, available from PPG, and DT885 (reducer) in a 1:1 ratio by volume. This was applied in two coats separated by 5 minutes between coats and then the basecoat was allowed to dry 10 minutes before a clearcoat was applied.

Using the SATA 5500 RP paint spray gun, with a 1.3 mm tip at 32 psi gun pressure and a 3M PPS PAINT PREPARATION SYSTEM, a clearcoat layer was applied. The clearcoat was prepared by blending, in a 3M PPS paint cup, EC530 (clearcoat), ECH5075 (catalyst) and ECR75 (reducer), all available from PPG, in a 3:1:1 ratio by volume. The clearcoat was applied in two coats separated by 10 minutes between coats. The coated panels were then baked in a paint booth for 40 minutes at 155° F. booth temperature after clear coat application. The stated bake time includes time for temperature ramp from about 75° F. to the 155° setpoint. Panels were stored at room temperature for 3 weeks, and then placed in an 180° F. oven for 4 hours.

Prior to coating with a composition of the present disclosure, the modified test panels (as described above) were prepped as follows: approximately 1.0 g of Meguiar's M205 mirror glaze, available from Meguair's, Inc., Irvine, Calif., was spread evenly onto a Meguiar's Soft Buff DA Foam Polishing Disc, 6 in (15.2 cm), which was attached to a Meguiar's MT300 dual action polisher set to 5200 revolutions per minute (rpm). Using moderate pressure, each ACT test panel was polished for 1 minute. After polishing, the residue remaining on the panel was cleaned off using a 3M microfiber towel (PN 39016) available from 3M Company, and Foaming Aerosol Glass Cleaner (PN 08888) available from 3M Company.

Examples 1-5 (Ex. 1-Ex. 5) and Comparative Examples 6-9 (CE-6-CE-9)

The formulations for Ex. 1-Ex. 8 are shown in Table 2. The examples were prepared by mixing the indicated components in 20 mL glass vials. The solutions were then coated on the previously prepared panels using the following procedure. A 4 in (10.2 cm)×4 in (10.2 cm) YS01 cloth (80% polyester, 20% polyamide 190 GSM Suede microfiber), available from S.Y. Vina Joint-Stock Company, Nhon Trach IZ 2, Nhon Trach-Dong Nai, Vietnam, was wrapped around a 1.5 in (3.8 cm)×3 in (7.6 cm) foam block available from Detailing.com (item #GYE-FOAMBLOCK). Approximately 0.5 milliliter (mL) of a solution was applied to the cotton cloth wrapped foam block and then applied, via wiping for 30 seconds, onto a panel. The coated panel was allowed to cure for 45 seconds before the excess coating solution was buffed off of the panel using a detailing cloth available under the trade designation "PERFECT-IT DETAILING CLOTH", PN 06016, available from 3M Company. Each panel was coated twice with the solution waiting 60 minutes between coats.

After the second coat was applied to the panel, the panel was allowed to further cure for 72 hours in a controlled temperature and humidity room set at 72° F. and 50% relative humidity. After 72 hours, the panels were tested using the test methods described below.

TABLE 4

| | Siloxane Polymer Characterization | | |
|---|---|---|---|
| Polymer | Methanol Eq. wt. | Methoxy wt. % | Hydrolysable silane groups/molecule |
| TMS C 50 | 1210 | 2.6 | 3.12 |
| TMS Di 50 | 641 | 5.0 | 2.00 |
| Polymer 1 | 692 | 4.6 | 2.00 |
| Polymer 2 | 148 | 21.7 | 7.00 |

Example 10

"TMS C50" silicone (19.14 g) was added to a beaker. A prop mixer was used to stir the "TMS C50" silicone while 5.00 g of "OFS-2306" was added slowly. "DYNASYLAN SIVO 214" aminofunctional silane (0.74 g) was added to the mixture while continuing to stir. Kkat (0.12 g) was added to the mixture, which was stirred until homogeneous. "SURFONIC L24-5" nonionic surfactant (6.25 g) was added to the mixture. The mixture was stirred until homogeneous. Mixing was stopped, and the mixture was allowed to stop moving completely. Water (11.25 g) was added to the solution. The mixture was then mixed vigorously for 5 minutes and then diluted with 457.5 g of water.

TABLE 2

| | Formulations. | | | | | | | | |
|---|---|---|---|---|---|---|---|---|---|
| Component | Ex. 1 | Ex. 2 | Ex. 3 | Ex. 4 | Ex. 5 | CE-6 | CE-7 | CE-8 | CE-9 |
| TMS C50 (g) | 8 | 8.3 | 8 | 8 | 8.2 | 0 | 8.5 | 0 | 0 |
| Polymer 1 (g) | 0 | 0 | 0 | 0 | 0 | 8 | 0 | 0 | 0 |
| Polymer 2 (g) | 0 | 0 | 0 | 0 | 0 | 0 | 0 | 0 | 8 |
| TMS Di 50 (g) | 0 | 0 | 0 | 0 | 0 | 0 | 0 | 8 | 0 |
| OFS-2306 (g) | 1 | 1 | 1 | 1 | 1 | 1 | 1 | 1 | 1 |
| PDMS-50 cst (g) | 0.3 | 0 | 0.3 | 0.3 | 0.3 | 0.3 | 0.3 | 0.3 | 0.3 |
| Kkat (g) | 0.2 | 0.2 | 0.2 | 0.2 | 0 | 0.2 | 0.2 | 0.2 | 0.2 |
| APTES (g) | 0.5 | 0.5 | 0 | 0 | 0.5 | 0.5 | 0 | 0.5 | 0.5 |
| APTMS (g) | 0 | 0 | 0.5 | 0 | 0 | 0 | 0 | 0 | 0 |
| BSA (g) | 0 | 0 | 0 | 0.5 | 0 | 0 | 0 | 0 | 0 |

TABLE 3

| | Experimental Results. | | | | | | | | |
|---|---|---|---|---|---|---|---|---|---|
| | Ex. 1 | Ex. 2 | Ex. 3 | Ex. 4 | Ex. 5 | CE-6 | CE-7 | CE-8 | CE-9 |
| Advancing CA (°) Initial | 109 | 109 | 107 | 108 | 109 | 108 | 109 | 103 | 104 |
| Advancing CA (°) After Scrub | 109 | 110 | 108 | 107 | 110 | 106 | 104 | 105 | 101 |
| Receding CA (°) Initial | 102 | 102 | 106 | 105 | 93 | 101 | 99 | 100 | 79 |
| Receding CA (°) After Scrub | 95 | 94 | 99 | 100 | 74 | 91 | 68 | 97 | 73 |
| Static CA (°) Initial | 104 | 104 | 106 | 104 | 106 | 101 | 108 | 101 | 96 |
| Static CA (°) After Scrub | 102 | 103 | 103 | 103 | 99 | 98 | 98 | 99 | 95 |
| COF (KP) Initial | 0.065 | 0.063 | 0.050 | 0.055 | 0.086 | 0.123 | 0.060 | 0.109 | 0.150 |
| COF (KP) After Scrub | 0.095 | 0.097 | 0.057 | 0.057 | 0.117 | 0.172 | 0.151 | 0.171 | 0.507 |

Example 11

"TMS C50" silicone (19.14 g) was added to a beaker. A prop mixer was used to stir the "TMS C50" silicone while 5.00 g of "OFS-2306" was added slowly. "DYNASYLAN SIVO 214" aminofunctional silane (0.74 g) was added to the mixture while continuing to stir. Kkat (0.12 g) was added to the mixture, which was stirred until homogeneous. Water (468.75 g) was added to a separate beaker. "ECOSURF EH-6" nonionic surfactant (5 g) and "DISPONIL FES 32 IS" anionic surfactant (1.25 g) were added to the water while mixing. The mixture was stirred until homogeneous. The first mixture was then slowly added to the water and surfactant mixture. The resulting mixture was mixed until homogeneous.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A composition comprising:
a first polyorganosiloxane comprising divalent units represented by formula:

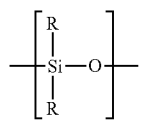

and greater than two $-Si(Y)_p(R)_{3-p}$ groups,
wherein the first polyorganosiloxane comprises (m) terminal units represented by formula $-Q-Si(Y)_p(R)_{3-p}$ and (n) divalent units represented by formula:

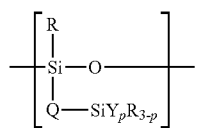

wherein
each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N($R^{11}$)—, or combination thereof, wherein aryl, arylalkylenyl, and heterocycloalkyenyl are unsubstituted or substituted by at least one alkyl, alkoxy, halogen, or combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof;
each Q is independently a bond, alkylene, arylene, or alkylene that is at least one of interrupted or terminated by aryl, wherein the alkylene, arylene, and alkylene that is at least one of interrupted or terminated by aryl are optionally at least one of interrupted or terminated by at least one ether, thioether, amine, amide, ester, thioester, carbonate, thiocarbonate, carbamate, thiocarbamate, urea, thiourea, or a combination thereof;
each Y is independently a hydrolyzable group;
p is 1, 2, or 3;
(n) is at least 1; and
(m)+(n) is in a range from 3 to 6; and
at least one of
an amino-functional silane represented by formula $(R^6)_2N-[R^4-Z]_r-R^4-[Si(Y)_p(R^5)_{3-p}]$ or a cyclic azasilane represented by formula

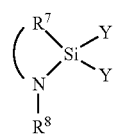

wherein
each $R^4$ is independently alkylene, arylene, or alkylene optionally interrupted or terminated by arylene;
$R^5$ is alkyl, aryl, arylalkylenyl, or heterocycloalkylenyl, wherein aryl and arylalkylenyl are unsubstituted or substituted by at least one alkyl, alkoxy, or combination thereof;
each Z is independently —O— or —N($R^6$)—;
each $R^6$ is independently hydrogen, alkyl, aryl, arylalkylenyl, or $-R^4-[Si(Y)_p(R^5)_{3-p}]$, wherein aryl and arylalkylenyl are unsubstituted or substituted by at least one alkyl, alkoxy, or combination thereof;
$R^7$ is an alkylene having 2 to 5 carbon atoms and is uninterrupted or interrupted by at least one catenated —N($R^8$)—;
each $R^8$ is independently hydrogen, alkyl, or alkenyl, wherein alkyl and alkenyl are unsubstituted or substituted by —N$R^1R^2$, wherein $R^1$ and $R^2$ are independently hydrogen or alkyl;
each Y is independently a hydrolyzable group;
r is 0, 1, 2, or 3; and
p is 1, 2, or 3,
wherein when the composition is applied to a surface of a substrate and at least partially cured to form a coated surface, the coated surface has a receding deionized water contact angle of greater than 80 after 500 scrubs using the Panel Scrub Method.

2. The composition of claim 1, wherein the ratio of divalent units represented by formula:

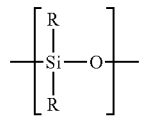

to $-Si(Y)_p(R)_{3-p}$ groups is at least 4.

3. The composition of claim 1, wherein the first polyorganosiloxane further comprises at least one terminal —Si(R)$_3$ group, wherein each R is independently alkyl or phenyl.

4. The composition of claim 1, wherein each Y is methoxy, and wherein the first polyorganosiloxane has a weight percent of methoxy groups of not more than 20 weight percent, based on the total weight of the first polyorganosiloxane.

5. The composition of claim 1, further comprising a silane represented by formula:

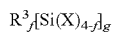

wherein:
g is 1 to 6;
f is 0, 1, or 2, with the proviso that when f is 0, g is 1;
each $R^3$ is monovalent or multivalent and is independently alkyl, aryl, or arylalkylenyl, wherein alkyl and arylalkylenyl are each uninterrupted or interrupted with at least one catenated —O—, —N($R^{11}$)—, —S—, —P—, —Si— or combination thereof, wherein aryl and arylalkylenyl are each unsubstituted or substituted by alkyl or alkoxy, and wherein alkyl, aryl, and arylalkylenyl are each unsubstituted or substituted with at least one epoxy, thiol, (meth)acrylate, vinyl, allyl, isocyanate, thiocyanate, ureido, chloro, or a combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof; and
each X is independently hydroxyl or a hydrolyzable group.

6. The composition of claim 1, further comprising a catalyst for at least one of hydrolyzing the Y groups in at least one of the first polyorganosiloxane, amino-functional silane, or cyclic azasilane or condensing silanol groups to form siloxane bonds.

7. The composition of claim 1, further comprising a second polyorganosiloxane comprising divalent units represented by formula:

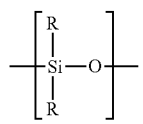

wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N($R^{11}$)—, or combination thereof, wherein aryl, arylalkylenyl, and heterocycloalkyenyl are unsubstituted or substituted by at least one alkyl, alkoxy, halogen, or combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof, and wherein the second polyorganosiloxane does not include hydrolyzable groups.

8. The composition of claim 1, further comprising a third polyorganosiloxane comprising divalent units represented by formula:

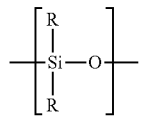

and at least one —Si(Y)$_p$(R)$_{3-p}$ group,
wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N($R^{11}$)—, or combination thereof, wherein aryl, arylalkylenyl, and heterocycloalkyenyl are unsubstituted or substituted by at least one alkyl, alkoxy, halogen, or combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof.

9. The composition of claim 1, wherein the amino-functional silane is 3-aminopropyltrimethoxysilane, 3-aminopropyltriethoxysilane, bis(3-trimethoxysilylpropyl)amine, bis(3-triethoxysilylpropyl)amine, N-methyl-bis(3-trimethoxysilylpropyl)amine, N-methyl-bis(3-triethoxysilylpropyl)amine, [3-(2-aminoethylamino)propyl]trimethoxysilane, 3-[2-(2-aminoethylamino)ethylamino]propyltrimethoxysilane, [3-(2-aminoethylamino)propyl]triethoxysilane, 3-[2-(2-aminoethylamino)ethylamino]propyltriethoxysilane, N,N'-bis[3-trimethoxysilylpropyl]-ethylenediamine, N,N-bis[3-trimethoxysilylpropyl]-ethylenediamine, or a combination thereof, and wherein the cyclic azasilane is 2,2-dimethoxy-N-butyl-1-aza-2-silacyclopentane, 2-methyl-2-methoxy-N-(2-aminoethyl)-1-aza-2-silacyclopentane, 2,2-diethoxy-N-(2-aminoethyl)-1-aza-2-silacyclopentane, 2,2-dimethyl-N-allyl-1-aza-2-silacyclopentane, 2,2-dimethoxy-N-methyl-1-aza-2-silacyclopentane, 2,2-diethoxy-1-aza-2-silacyclopentane, 2,2-dimethoxy-1,6-diaza-2-silacyclooctane, N-methyl-1-aza-2,2,4-trimethylsilacyclopentane, or a combination thereof.

10. The composition of claim 1, wherein the first polyorganosiloxane is a linear polyorganosiloxane.

11. The composition of claim 1, wherein the composition is at least one of essentially free of fluorinated silanes, comprises not more than five percent by weight water, based on the total weight of the composition, or comprises not more than 20 percent by weight organic solvent, based on the total weight of the composition.

12. A composition: comprising water:
at least one of a nonionic surfactant or an anionic surfactant;
a first polyorganosiloxane comprising divalent units represented by formula:

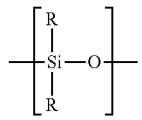

and greater than two —Si(Y)$_p$(R)$_{3-p}$ groups, wherein
each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N($R^{11}$)—, or combination thereof, wherein aryl, arylalkylenyl, and heterocycloalkyenyl are unsubstituted or substituted by at least one alkyl, alkoxy, halogen, or combination thereof, and wherein $R^1$ is hydrogen, alkyl, aryl, or arylalkylenyl, wherein aryl and arylalkylenyl are unsubstituted or substituted by at least one alkyl, alkoxy, or combination thereof;
each Y is independently a hydrolyzable group; and
p is 1, 2, or 3; and
at least one of
an amino-functional silane represented by formula ($R^6$)$_2$N-[$R^4$-Z]$_{-r-}R^4$-[Si(Y)$_p$($R^5$)$_{3-p}$] or a cyclic azasilane represented by formula

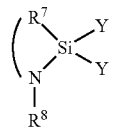

wherein
- each $R^4$ is independently alkylene, arylene, or alkylene optionally interrupted or terminated by arylene;
- $R^5$ is alkyl, aryl, arylalkylenyl, or heterocycloalkylenyl, wherein aryl and arylalkylenyl are unsubstituted or substituted by at least one alkyl, alkoxy, or combination thereof;
- each Z is independently —O— or —N($R^6$)—;
- each $R^6$ is independently hydrogen, alkyl, aryl, arylalkylenyl, or —$R^4$—[Si(Y)$_p$($R^5$)$_{3-p}$], wherein aryl and arylalkylenyl are unsubstituted or substituted by at least one alkyl, alkoxy, or combination thereof;
- $R^7$ is an alkylene having 2 to 5 carbon atoms and is uninterrupted or interrupted by at least one catenated —NR($R^8$)—;
- each $R^8$ is independently hydrogen, alkyl, or alkenyl, wherein alkyl and alkenyl are unsubstituted or substituted by —N$R^1R^2$, wherein $R^1$ and $R^2$ are independently hydrogen or alkyl;
- each Y is independently a hydrolyzable group;
- r is 0, 1, 2, or 3; and
- p is 1, 2, or 3.

13. A method of making a coated article, the method comprising:
applying the composition of claim 1 on at least a portion of a surface of a substrate; and
allowing or inducing the composition to at least partially cure to form a coating on at least a portion of the surface of the substrate.

14. The method of claim 13, further comprising removing a portion of the composition from the surface of the substrate before allowing or inducing the composition to fully cure.

15. The method of claim 13, wherein the substrate is at least a portion of a vehicle.

16. A coated article made by the method of claim 13.

17. The composition of claim 1, wherein the first polyorganosiloxane comprises not more than two terminal units represented by formula -Q-Si(Y)$_p$(R)$_{3-p}$.

18. The composition of claim 1, wherein each Y is independently alkoxy, aryloxy, or acyloxy.

19. The composition of claim 12, wherein the ratio of divalent units represented by formula:

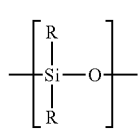

to —Si(Y)$_p$(R)$_{3-p}$ groups is at least 4.

20. The composition of claim 12, wherein the first polyorganosiloxane comprises (m) terminal units represented by formula -Q-Si(Y)$_p$(R)$_{3-p}$ and (n) divalent units represented by formula:

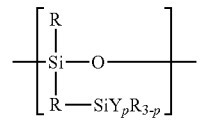

wherein
- each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N($R^{11}$)—, or combination thereof, wherein aryl, arylalkylenyl, and heterocycloalkyenyl are unsubstituted or substituted by at least one alkyl, alkoxy, halogen, or combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof;
- each Q is independently a bond, alkylene, arylene, or alkylene that is at least one of interrupted or terminated by aryl, wherein the alkylene, arylene, and alkylene that is at least one of interrupted or terminated by aryl are optionally at least one of interrupted or terminated by at least one ether, thioether, amine, amide, ester, thioester, carbonate, thiocarbonate, carbamate, thiocarbamate, urea, thiourea, or a combination thereof;
- each Y is independently a hydrolyzable group;
- p is 1, 2, or 3;
- (n) is at least 1; and
- (m)+(n) is greater than 2.

21. The composition of claim 20, wherein (m)+(n) is in a range from 3 to 6.

22. The composition of claim 12, wherein the first polyorganosiloxane further comprises at least one terminal —Si(R)$_3$ group, wherein each R is independently alkyl or phenyl.

23. The composition of claim 12, wherein each Y is methoxy, and wherein the first polyorganosiloxane has a weight percent of methoxy groups of not more than 20 weight percent, based on the total weight of the first polyorganosiloxane.

24. The composition of claim 12, further comprising a silane represented by formula:

$$R^3{}_f[Si(X)_{4-n}]_g$$

wherein:
- g is 1 to 6;
- f is 0, 1, or 2, with the proviso that when f is 0, g is 1;
- each $R^3$ is monovalent or multivalent and is independently alkyl, aryl, or arylalkylenyl, wherein alkyl and arylalkylenyl are each uninterrupted or interrupted with at least one catenated —O—,—N($R^{11}$)—, —S—, —P—, —Si— or combination thereof, wherein aryl and arylalkylenyl are each unsubstituted or substituted by alkyl or alkoxy, and wherein alkyl, aryl, and arylalkylenyl are each unsubstituted or substituted with at least one epoxy, thiol, (meth) acrylate, vinyl, allyl, isocyanate, thiocyanate, ureido, chloro, or a combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof; and
- each X is independently hydroxyl or a hydrolyzable group.

25. The composition of claim 12, further comprising a catalyst for at least one of hydrolyzing the Y groups in at least one of the first polyorganosiloxane, amino-functional silane, or cyclic azasilane or condensing silanol groups to form siloxane bonds.

26. The composition of claim 12, further comprising a second polyorganosiloxane comprising divalent units represented by formula:

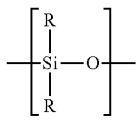

wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N($R^{11}$)—, or combination thereof, wherein aryl, arylalkylenyl, and heterocycloalkyenyl are unsubstituted or substituted by at least one alkyl, alkoxy, halogen, or combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof, and wherein the second polyorganosiloxane does not include hydrolyzable groups.

27. The composition of claim 12, further comprising a third polyorganosiloxane comprising divalent units represented by formula:

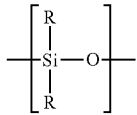

and at least one —Si(Y)$_p$(R)$_{3-p}$ group,
wherein each R is independently alkyl, aryl, arylalkylenyl, or heterocycloalkylenyl, wherein alkyl and arylalkylenyl are unsubstituted or substituted with halogen and optionally interrupted by at least one catenated —O—, —S—, —N($R^{11}$)—, or combination thereof, wherein aryl, arylalkylenyl, and heterocycloalkyenyl are unsubstituted or substituted by at least one alkyl, alkoxy, halogen, or combination thereof, and wherein $R^{11}$ is hydrogen, alkyl, aryl, or arylalkylenyl, wherein aryl and arylalkylenyl are unsubstituted or substituted by at least one alkyl, alkoxy, or combination thereof.

28. The composition of claim 12, wherein the amino-functional silane is 3-aminopropyltrimethoxysilane, 3-aminopropyltriethoxysilane, bis(3-trimethoxysilylpropyl)amine, bis(3-triethoxysilylpropyl)amine, N-methyl-bis(3-trimethoxysilylpropyl)amine, N-methyl-bis(3-triethoxysilylpropyl)amine, [3-(2-aminoethylamino)propyl]trimethoxysilane, 3-[2-(2-aminoethylamino)ethylamino]propyltrimethoxysilane, [3-(2-aminoethylamino) propyl] triethoxysilane, 3-[2-(2-aminoethylamino) ethylamino] propyltriethoxysilane, N,N'-bis [3-trimethoxysilylpropyl]-ethylenediamine, N,N-bis [3-trimethoxysilylpropyl]-ethylenediamine, or a combination thereof, and wherein the cyclic azasilane is 2,2-dimethoxy-N-butyl-1-aza-2-silacyclopentane, 2-methyl-2-methoxy-N-(2-aminoethyl)-1-aza-2-silacyclopentane, 2,2-diethoxy-N-(2-aminoethyl)-1-aza-2-silacyclopentane, 2,2-dimethyl-N-allyl-1-aza-2-silacyclopentane, 2,2-dimethoxy-N-methyl-1-aza-2-silacyclopentane, 2,2-diethoxy-1-aza-2-silacyclopentane, 2,2-dimethoxy-1,6-diaza-2-silacyclooctane, N-methyl-1-aza-2,2,4-trimethylsilacyclopentane, or a combination thereof.

29. The composition of claim 12, wherein the first polyorganosiloxane is a linear polyorganosiloxane.

30. The composition of claim 12, wherein each Y is independently alkoxy, aryloxy, or acyloxy.

* * * * *